United States Patent [19]

Wheeler et al.

[11] Patent Number: 5,195,760

[45] Date of Patent: * Mar. 23, 1993

[54] KEYLESS CHUCK

[75] Inventors: Dale K. Wheeler, Fallston, Md.; Charles W. Coleman, Cassville, Pa.

[73] Assignee: Black & Decker Inc., Newark, Del.

[*] Notice: The portion of the term of this patent subsequent to Jul. 18, 2006 has been disclaimed.

[21] Appl. No.: 537,038

[22] Filed: Jun. 12, 1990

[51] Int. Cl.$^5$ ............................................. B23B 31/16
[52] U.S. Cl. ..................................... 279/60; 279/902
[58] Field of Search ................. 279/60, 65, 23, 1 K, 279/156, 134, 135, 61-64, 59, 56, 902

[56] References Cited

U.S. PATENT DOCUMENTS

| | | | |
|---|---|---|---|
| 914,255 | 3/1909 | Farnham | 279/60 |
| 1,159,248 | 11/1915 | Morrow | 279/60 |
| 2,406,444 | 8/1946 | Stoner . | |
| 2,553,990 | 5/1951 | Vidal | 279/60 |
| 2,683,041 | 7/1954 | Haviland . | |
| 2,716,555 | 8/1955 | Rowe | 279/56 |
| 3,350,108 | 10/1967 | Troka . | |
| 3,506,277 | 4/1970 | Harms . | |
| 3,545,776 | 12/1970 | Haviland | 279/63 |
| 3,599,999 | 8/1971 | Schnizler | 279/60 |
| 3,712,633 | 1/1973 | Schadlich | 279/58 |
| 3,737,170 | 6/1973 | Wanner et al. | 279/60 |
| 4,103,914 | 8/1978 | Rohm | 279/4 |
| 4,213,623 | 7/1980 | Rohm | 279/1 C |
| 4,266,789 | 5/1981 | Wahl | 279/60 |
| 4,305,597 | 12/1981 | McCarthy | 279/22 |
| 4,317,578 | 3/1982 | Welch | 279/60 |
| 4,463,960 | 8/1984 | Walton | 279/60 |
| 4,491,445 | 1/1985 | Hunger | 279/60 X |
| 4,498,682 | 2/1985 | Glore | 279/1 K |
| 4,526,497 | 7/1985 | Hatfield | 408/240 |
| 4,527,809 | 7/1985 | Umbert | 279/64 |
| 4,536,113 | 8/1985 | Hatfield | 409/234 |
| 4,592,560 | 6/1986 | Neumaier | 279/81 |

(List continued on next page.)

Primary Examiner—Steven C. Bishop
Attorney, Agent, or Firm—Dennis A. Dearing; John D. Del Ponti; Charles E. Yocum

[57] ABSTRACT

A keyless chuck (10; 301) comprises a jaw housing (28; 303) with jaws (32; 333, 335, 337) which are slidably mounted in guideways (40; 319, 321, 323) between a rearward opened position and a forward closed position. A jaw thrust member (34; 345) is coupled to the jaws and is slidably mounted in the jaw housing to apply a thrust force to the jaws and to maintain the jaws in the same relative axial location. A nut (42; 355) is fixed to the jaw housing and has a threaded opening (46; 357) coaxial with the chuck axis ($A_x$). A threaded spindle (48; 305) is engaged in the nut opening and is movable forwardly to apply clamping force to the jaws and rearwardly to remove clamping force. The spindle preferably engages the jaw thrust member through a small area contact patch (72; 401) to limit operating friction. The jaws either may be opened and closed responsive to rearward and forward movement of the spindle respectively or to simplify loading of a bit in the chuck, may be spring biased forwardly to a closed position (self-centering) and thus not movable responsive to movement of the spindle. A lock mechanism (22, 104, 42; 309) is preferably provided to limit relative rotation between the nut and spindle to prevent the application of excessive clamping force and to limit removal of clamping force. The lock mechanism also preferably permits incremental self-tightening when in the locked position through an automatic tightener (397) and through the sizing and spacing of two sets of teeth (373, 375) to limit the application and removal of clamping force on a drill bit. To limit the run out in a finished chuck, deformable (during assembly) interfaces (204; 401) are preferably provided between the jaw housing and nut and between the spindle and jaw thrust member (stop). To further enhance the accuracy of assembly and to reduce run out, the spindle and nut preferably have a smoothed walled interface (415, 417) to accurately control coaxial alignment of the nut and spindle.

53 Claims, 22 Drawing Sheets

U.S. PATENT DOCUMENTS

| | | | |
|---|---|---|---|
| 4,609,199 | 9/1986 | Rohm | 279/1 B |
| 4,648,608 | 3/1987 | Smith | 279/1 K |
| 4,682,918 | 7/1987 | Palm | 408/241 |
| 4,695,065 | 9/1987 | Komatsu | 279/60 |
| 4,840,387 | 6/1989 | McCarthy | 279/61 X |
| 4,848,779 | 7/1989 | Wheeler et al. | 279/60 |

FOREIGN PATENT DOCUMENTS

| | | |
|---|---|---|
| 1929242 | 6/1971 | Fed. Rep. of Germany . |
| 2639214 | 3/1978 | Fed. Rep. of Germany . |
| 3114503 | 11/1982 | Fed. Rep. of Germany . |
| 3424679 | 2/1986 | Fed. Rep. of Germany . |
| 3541964 | 6/1987 | Fed. Rep. of Germany . |
| 3713547 | 9/1988 | Fed. Rep. of Germany . |
| 1023518 | 3/1953 | France . |
| 191959 | 1/1923 | United Kingdom . |
| 1566855 | 5/1980 | United Kingdom . |

OTHER PUBLICATIONS

National/Panasonic pamphlet Re: Keyless Drill Chuck; Model No. EZ991.

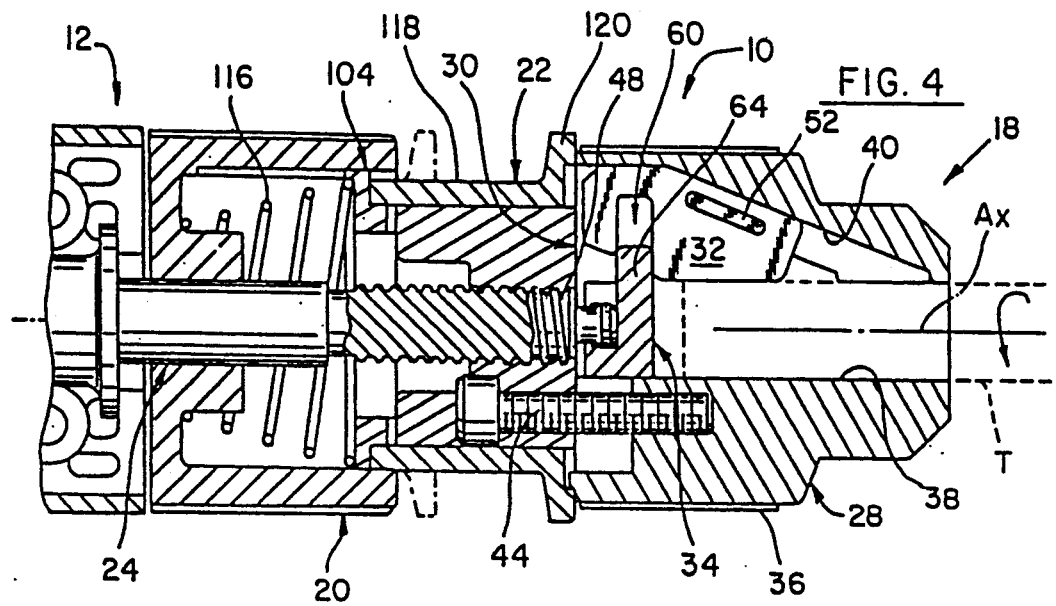
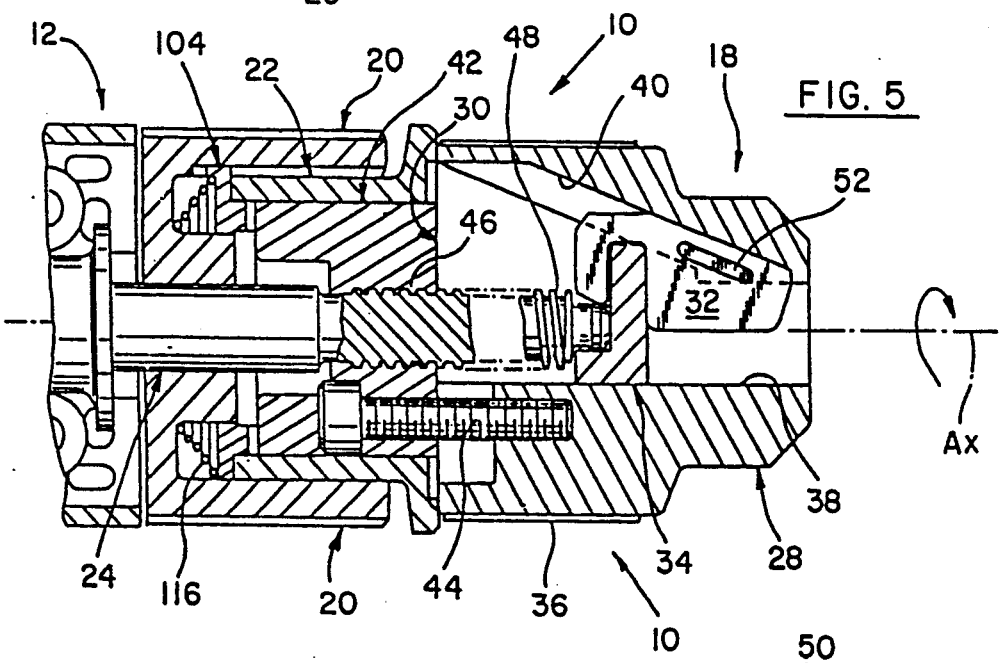
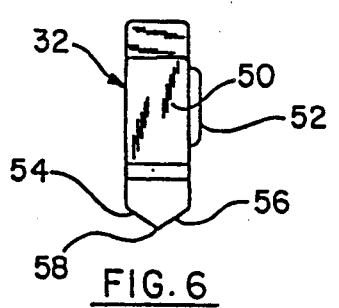
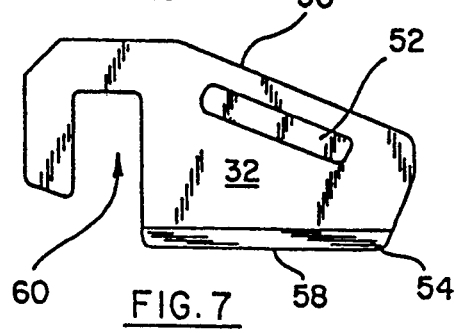

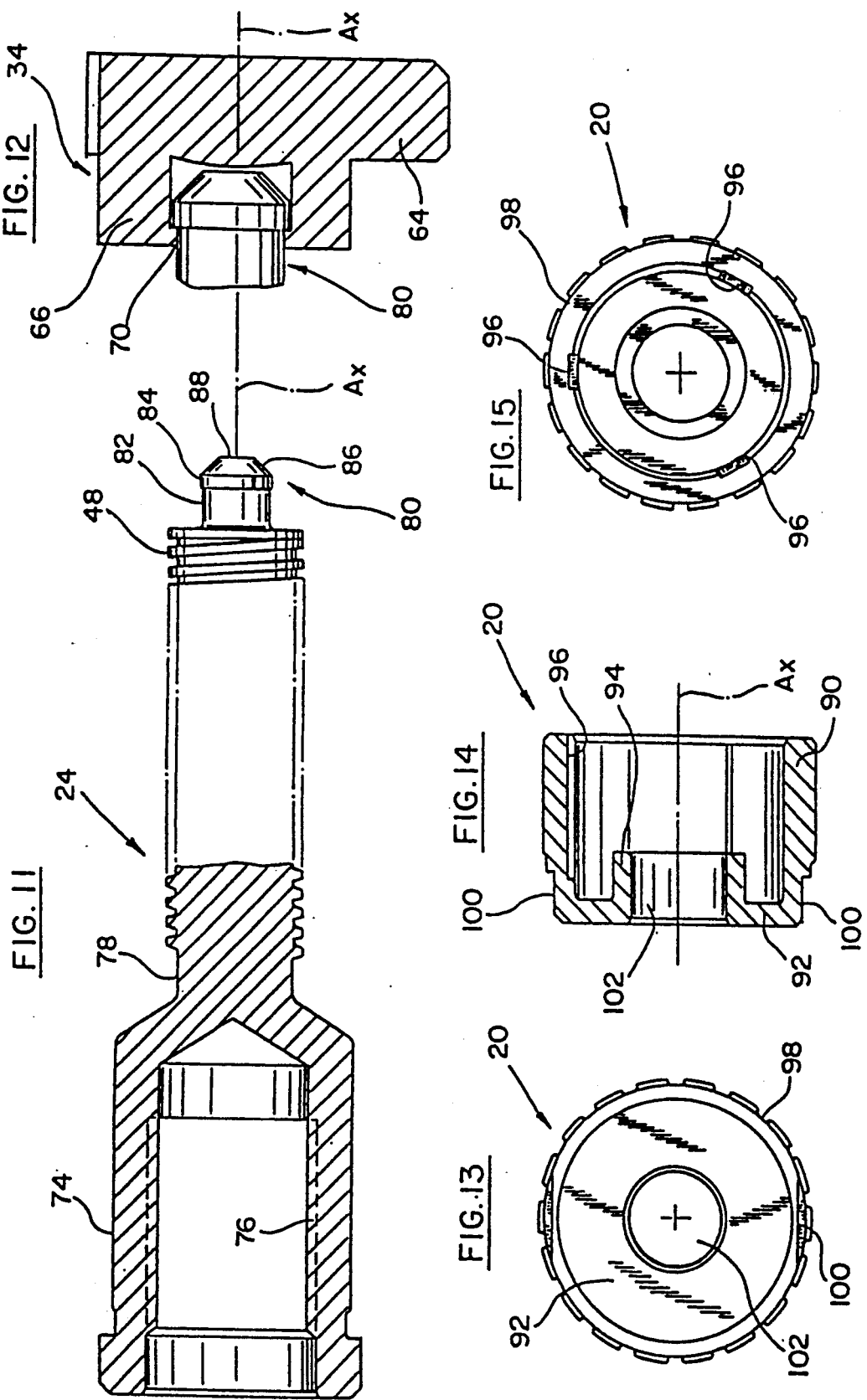

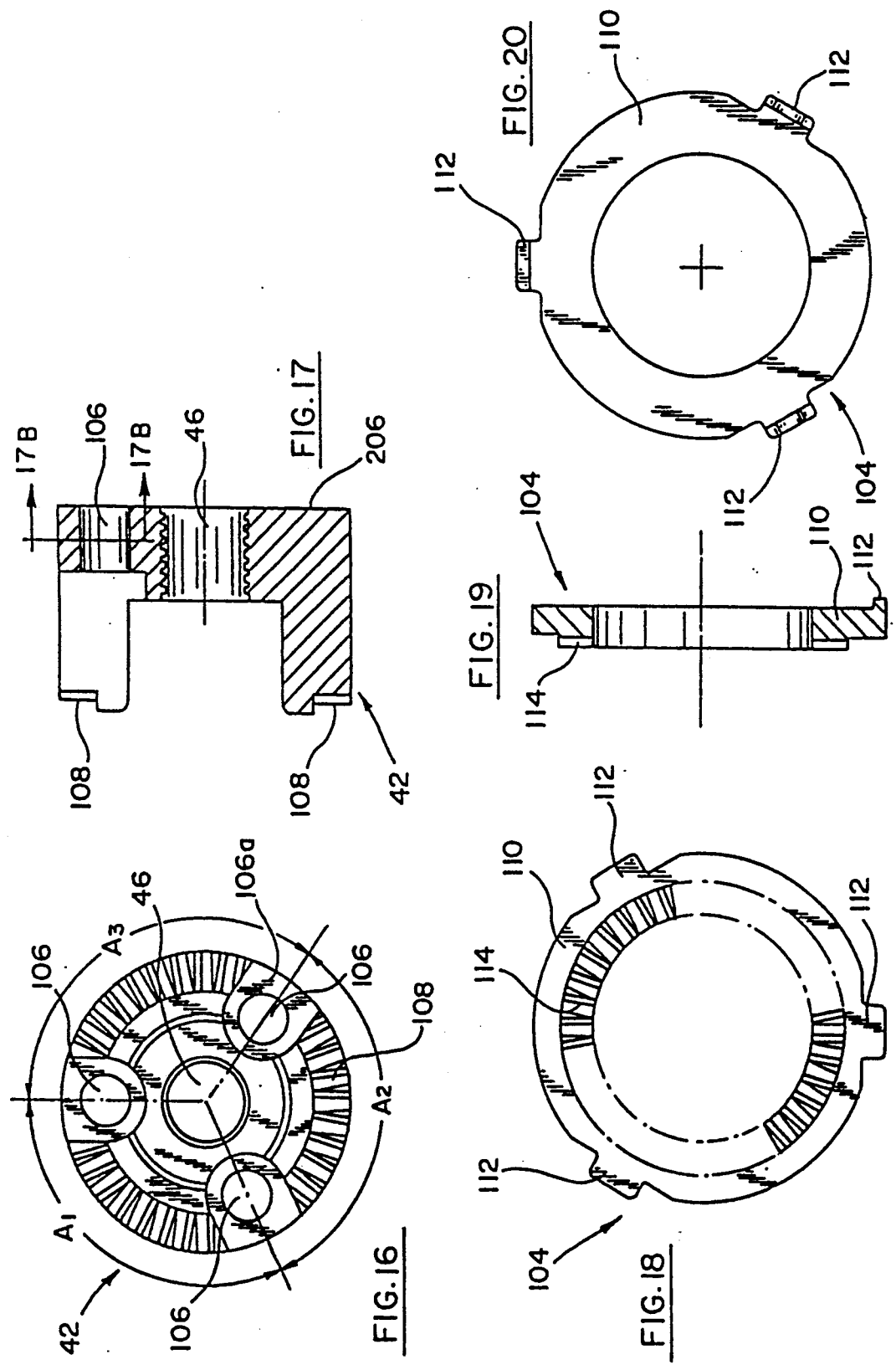

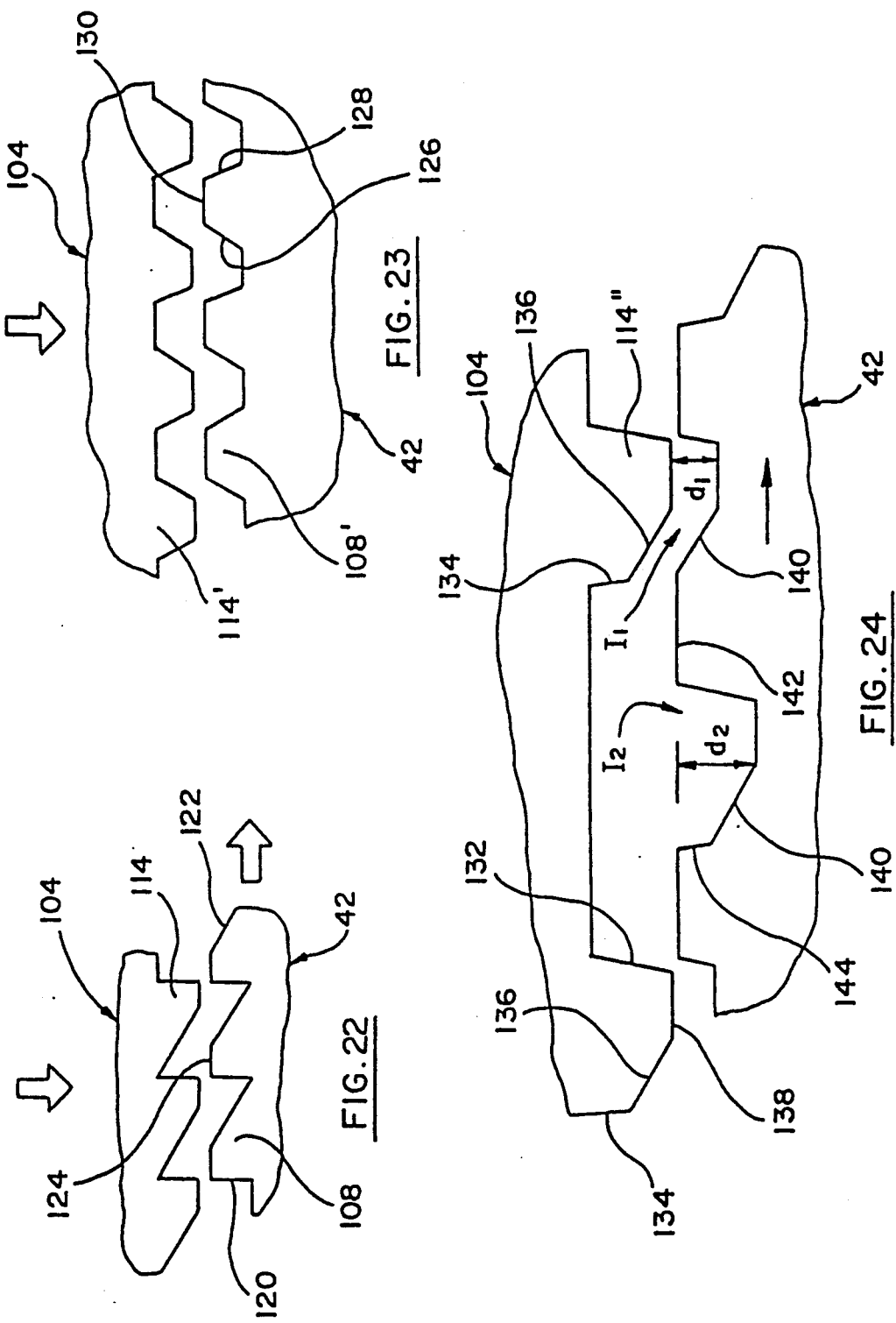

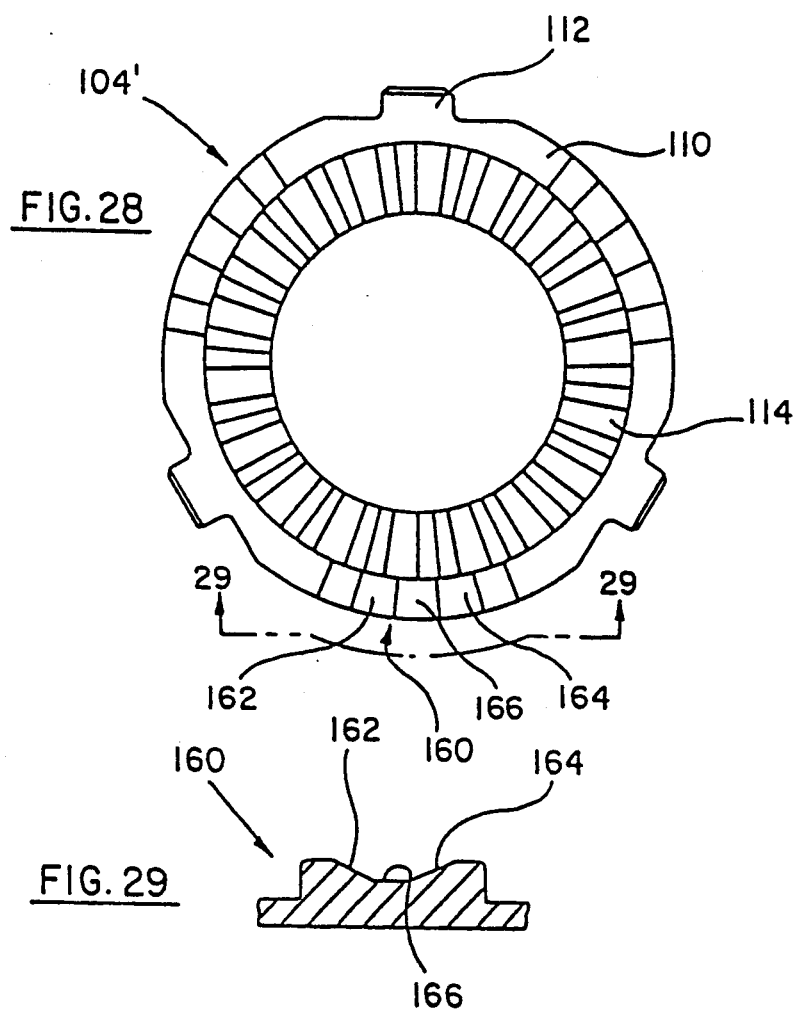
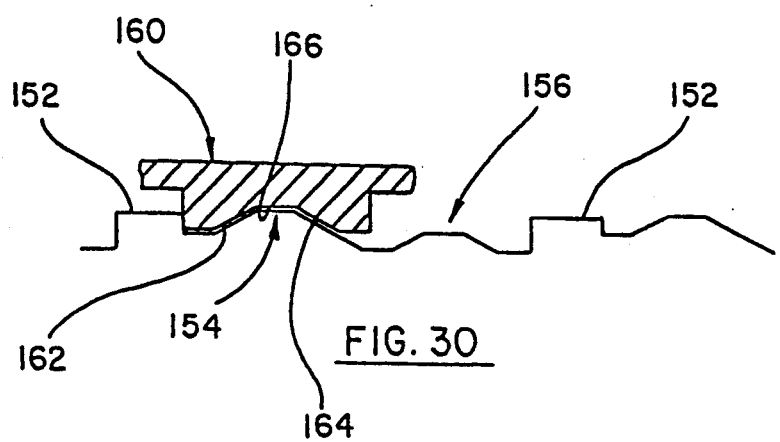

KEYLESS CHUCK

BACKGROUND OF THE INVENTION

The present invention relates to a chuck for releasably gripping a tool bit and, more particularly, to a keyless chuck which provides reliable bi-directional operation and can be hand-tightened and loosened on a tool bit and, further, which can selectively self-tighten in response to torque applied through the chuck.

Various types of chucks are known for releasably gripping the shank portion of a tool bit. The common Jacobs-style chuck includes a nosepiece which contains gripping jaws and a rotatably mounted adjusting sleeve that is adjusted to cause the jaws to grip or release a tool bit. The adjusting sleeve includes axially extending gear teeth that are adapted to cooperate with a gear-type key to permit manual tightening and loosening of the jaws. The requirement for a separate key necessitates a minimum level of manual skill to effect proper tightening of the jaws to avoid any slippage between the tool bit and the jaws. Additionally, the tightening key represents another part which is subject to loss or wear.

A number of drill chucks, known generically as keyless chucks, have been designed in an effort to eliminate the need for the tightening key. Some of these chucks are adapted to apply an initial, hand-tightening gripping force to the tool bit with the chuck self-tightening in response to torque applied through the tool bit and the chuck. Some of these keyless chucks have bee provided with gripping jaws which toggle in response to the reaction torque encountered by the tool bit and still others have been provided with cam-like surfaces which contact and cooperate with the gripping jaws to increase the gripping force.

It is important for any self-tightening keyless chuck to grip the tool bit in response to initial hand-tightening by the operator with sufficient gripping force to that the tool bit will not slip during either forward or reverse operation. It is also important that the chuck, as it self-tightens in response to applied torque, not over-tighten to the extent that the jaws effect local major surface crushing of the tool bit stem or cause a lock-up situation in which the chuck cannot be loosened. Over-tightening and lock-up are generally not encountered with power tools intended for the consumer market. However, where such keyless chucks are used on power tools intended for commercial or industrial market, the substantial torques provided by these tools can induce undesired over-tightening.

Known chuck designs have used one-way ratchet type mechanisms to allow a chuck to self-tighten in response to increased torque applied through the chuck and the tool bit. These designs allow the chuck to self-tighten in a progressive manner so that the tool bit will be reliably gripped as the applied torque is increased and prevent loosening of the chuck as a consequence of reverse operation. For example, U.S. Pat. No. 4,213,623 to Rohm discloses a drill chuck that includes an adjusting sleeve rotatably mounted to a chuck body for adjusting the gripping force applied by jaws mounted within the chuck body. The adjusting sleeve and the chuck body are coupled together by a one-way pawl and ratchet assembly. As the chuck is tightened in response to rotation of the adjusting sleeve relative to the chuck body, the pawl incrementally ratchets to a new position to maintain the tightened condition of the chuck and when the chuck is driven in reverse, prevents unintentional counter-rotation of the adjusting sleeve and loosening of the gripping jaws. In another chuck, as disclosed in U.S. Pat. No. 3,506,277 to Harms, an adjusting sleeve is rotatably mounted upon a chuck body to allow tightening or loosening of the gripping jaws. The chuck body includes ratchet teeth formed on an axial end face. The teeth are engagable with a similar set of teeth on a user adjustable spring biased sleeve. The teeth interengage to allow rotation of the adjusting sleeve to tighten the grip on the tool bit but prevent counter-rotation that would tend to loosen the tool bit. While these chucks are reasonably effective for their intended purpose, the chuck operator does not have full control over the manner by which the adjusting sleeve is operated and, accordingly, these chucks lack optimum operation flexibility.

SUMMARY OF THE INVENTION

In view of the above, it is an object of the present invention, among others, to provide a keyless self-tightening chuck that will reliably grip a tool bit for operation in the forward or reverse operating directions.

It is another object of the invention to provide a keyless chuck which has jaws which are biased closed with an improved means for guiding the jaws for movement between opened and closed positions and for clamping and unclamping a bit in the jaws.

It is another object of the present invention to provide a keyless chuck that can be hand-tightened and which self-tightens in response in applied torque and which maintains its self-tightened state.

It is another object of the present invention to provide a keyless chuck having a locking mechanism which allows the chuck adjusting sleeve to be locked against rotation in either direction and which locking mechanism can be selectively disabled.

It is another object of the present invention to provide a keyless chuck having a relatively low internal operating friction to permit convenient hand-tightening and self-tightening in response to torque applied through the chuck.

It is another object of the present invention to provide a keyless chuck having a "zero capacity" characteristic which allows the chuck to grip small diameter tool bits with less expensive machining of component parts.

It is another object of the present invention to provide a keyless chuck having minimal run-out and which can be repeatedly disassembled, serviced, and reassembled while maintaining the run-out tolerance.

In view of these objects, and others, the present invention provides a keyless chuck having a jaw housing with jaws that are slidably mounted in respective jaw guideways between a rearward opened position and a forward closed position. A jaw thrust member is coupled to the jaws and is slidably mounted in the jaw housing to apply a thrust force to the jaws and to maintain the jaws in the same relative axial location. A nut is fixed to the jaw housing and has a threaded opening coaxial with the chuck axis. A threaded spindle is engaged in the nut opening and is movable forwardly to apply clamping force of the jaws and rearwardly to remove clamping force.

The remote end of the spindle may include a projection which engages the jaw thrust member through a small area contact patch to limit the operating friction contribution of the jaw thrust member and thus provide a chuck which can be readily hand-tightened by the user and self-tightened in response to torque transmitted through the chuck.

As disclosed in one embodiment the jaws may be movable back and forth between a rearward opened position and a forward closed position by rearward and forward movement of the spindle or as disclosed in a second embodiment, may be biased forwardly to a closed position ("self-centering") and thus not movable responsive to movement of the spindle.

A lock mechanism may be provided to selectively lock a chuck adjusting (or rear) sleeve relative to the jaw housing to allow in one embodiment uni-directional movement of the chuck adjusting sleeve relative to the jaw housing or in a second embodiment bi-directionally lock the chuck adjusting sleeve relative to the jaw housing. The lock mechanism includes a lock plate coupled to the chuck adjusting sleeve and includes a set of teeth on an axial face of engagement with complementary teeth on an axial face of the chuck adjusting nut. The lock plate is normally spring-biased into engagement with the chuck adjusting nut. Depending upon the tooth configuration, the chuck adjusting nut can be operated in one direction during hand-tightening of the chuck and during the application of a torque transmitted through the chuck to facilitate self-tightening, fully locked against relative rotation or limited to a predetermined maximum amount of relative rotation before being fully locked. In one embodiment, a user-operable control sleeve allows the lock plate to be disengaged from the chuck adjusting nut to temporarily disable the locking mechanism, or, in another embodiment, rotated to disengage the lock plate from the chuck adjusting nut to selectively disable the lock mechanism.

The lock mechanism also preferably permits incremental self-tightening when in the locked position. One means is an automatic tightener which is engaged among the threaded member, locking mechanism and nut for tightening the jaws on a bit a predetermined amount when the spindle is driven, the bit is engaged with a workpiece and the locking mechanism is in the locked position. In the preferred embodiment, the nut and a locking member preferably have engaged teeth in the locked position. A rear sleeve fixed to the threaded member or spindle and a locking member have an engaged tab and slot to limit the relative rotation of the rear sleeve and locking member. The automatic tightener comprises the inner locking tab and slot.

A second means to provide incremental self-tightening when using the chuck is to size and space the two sets of teeth to permit (1) a first limited maximum amount of relative rotation between the nut and locking member in a first direction (tightening) to advance the spindle and (2) a second limited maximum amount of relative rotation between the nut and locking member in a second direction (loosening) to retract the spindle. The amount of relative rotation for self-tightening is greater than the amount of relative rotation for self loosening. The spacing of the teeth also insures that the sets of teeth reliably seat for locking.

The keyless chuck is assembled in such a way that the run-out of the finished chuck is minimal without use of machined parts (except for the spindle). At least one of the mating surfaces of the jaw housing and the chuck adjusting nut may be designed to deform during the assembly process to accommodate accumulated manufacturing tolerances with the relationship of the various parts maintained during the operating life of the chuck.

Also for the same purpose, a deformable interface may be provided between a jaw thrust member (or carrier) and the spindle. The keyless chuck can be disassembled for cleaning and servicing and re-assembled without loss of run-out.

To provide a coaxial alignment of the spindle and nut, the spindle may have a precision smooth walled section (outer diameter) mating with a precision smooth walled section (inner diameter) of the nut opening and have a threaded section mating with a threaded section of the nut opening. The coaxial alignment of the spindle and nut is determined by the mating interface of the smooth sections. The threads of the mating threaded sections are loosely meshed to control only fore and aft movement of the spindle through the nut without affecting the coaxial alignment.

The present invention advantageously provides numerous features which may be used individually or in combination. The keyless chuck may have a relatively low internal operating friction because of the small-area contact between the main spindle and the jaw thrust member (or carrier) and because the spindle has a small outer diameter relative to the outer diameter of the chuck. The locking mechanism may provide for unidirectional or by-directional locking of the chuck adjusting sleeve relative to the jaw housing, selective disablement of the locking mechanism, reliable seating for locking and/or incremental self-tightening. The mounting of the bit in the chuck may be simplified by the forwardly spring biased (self-centering) jaws for gripping a bit inserted into the chuck. The chuck may be initially assembled with one or more deformable surfaces which accommodate any accumulated manufacturing tolerances to provide a finished chuck with minimal run out. Also, to further enhance the accuracy of assembly and reduce run out, the spindle and nut may be provided with a smooth walled interface to accurately control coaxial alignment of the nut and spindle.

Other objects and further scope of applicability of the present invention will become apparent from the detailed description to follow taken in conjunction with the accompanying drawings, in which like parts are designated by like reference characters.

BRIEF DESCRIPTION OF THE DRAWINGS

The accompanying drawings which are incorporated in, and constitute a part of, this specification illustrate two primary embodiments of the invention and together with the description serve to explain the principles of the invention.

FIG. 4 is a cross-sectional view of a keyless chuck of the type designed to be integrally assembled with the electric drill, the jaws shown in a retracted position;

FIG. 5 is a cross-sectional view of the keyless chuck of FIG. 4 with the jaws in an advanced position;

FIG. 6 is an end view of a jaw for gripping a tool bit;

FIG. 7 is a side view of the jaw shown in FIG. 6;

FIG. 11 is a side view, in partial cross-section, of a main spindle;

FIG. 12 is an enlarged detailed view of the remote end of the main spindle of FIG. 11 in engagement with the jaw thrust member of FIGS. 8, 9 and 10;

FIG. 13 is an end view of a chuck adjusting sleeve;

FIG. 14 is a side view, in cross-section, of the chuck adjusting sleeve of FIG. 13;

FIG. 15 is an end view of the chuck adjusting sleeve from the side opposite that shown in FIG. 13;

FIG. 16 is an end view of a chuck adjusting nut illustrating a set of teeth on the end surface;

FIG. 17 is a side view, in cross-section, of the chuck adjusting nut of FIG. 16;

FIG. 18 is an end view of a lock plate illustrating a set of teeth for selective interengagement with the teeth of the chuck adjusting nut illustrated in FIG. 16;

FIG. 19 is a side view, in cross-section, of the lock plate of FIG. 18;

FIG. 20 is an end view of the lock plate from the side opposite that of FIG. 18;

FIG. 22 is a detailed view of a first set of interengaging teeth for selectively locking the chuck;

FIG. 23 is a detailed view of a second set of interengaging teeth for selectively locking the chuck;

FIG. 24 is a detailed view of a third set of interengaging teeth for selectively locking the chuck;

FIG. 28 is an end view of a second embodiment of a lock plate for cooperation with the control sleeve of FIGS. 25 and 26;

FIG. 29 is a detailed view of a cam formation of the lock plate of FIG. 28;

FIG. 30 is a detailed view illustrating the engagement of the cam profile of the control sleeve interengaging the cam formation of the lock plate of FIG. 28;

DESCRIPTION OF PREFERRED EMBODIMENTS

One embodiment of a keyless chuck in accordance with the present invention is shown in FIGS. 1-33. The second and preferred embodiment is shown in FIGS. 34-43.

Figure 1:
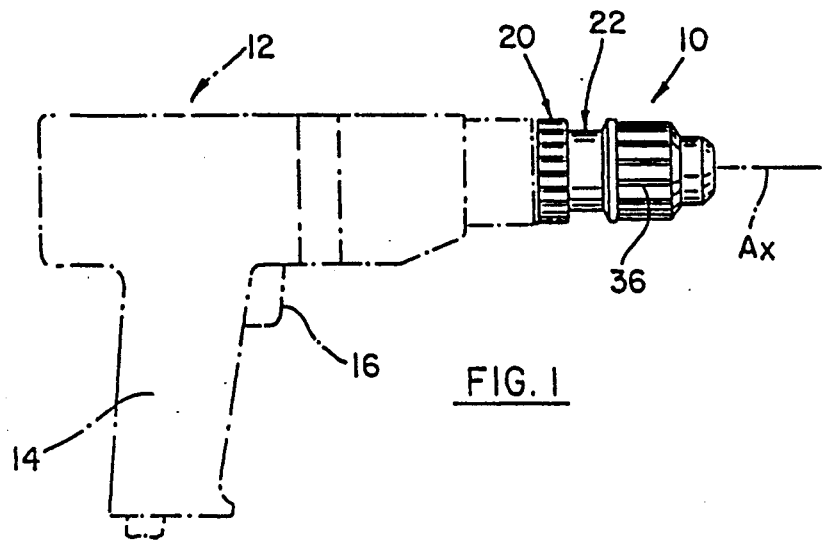
FIG. 1 is a side view of a keyless chuck in accordance with the present invention mounted on an exemplary pistol-grip electric drill.
Figure 2:
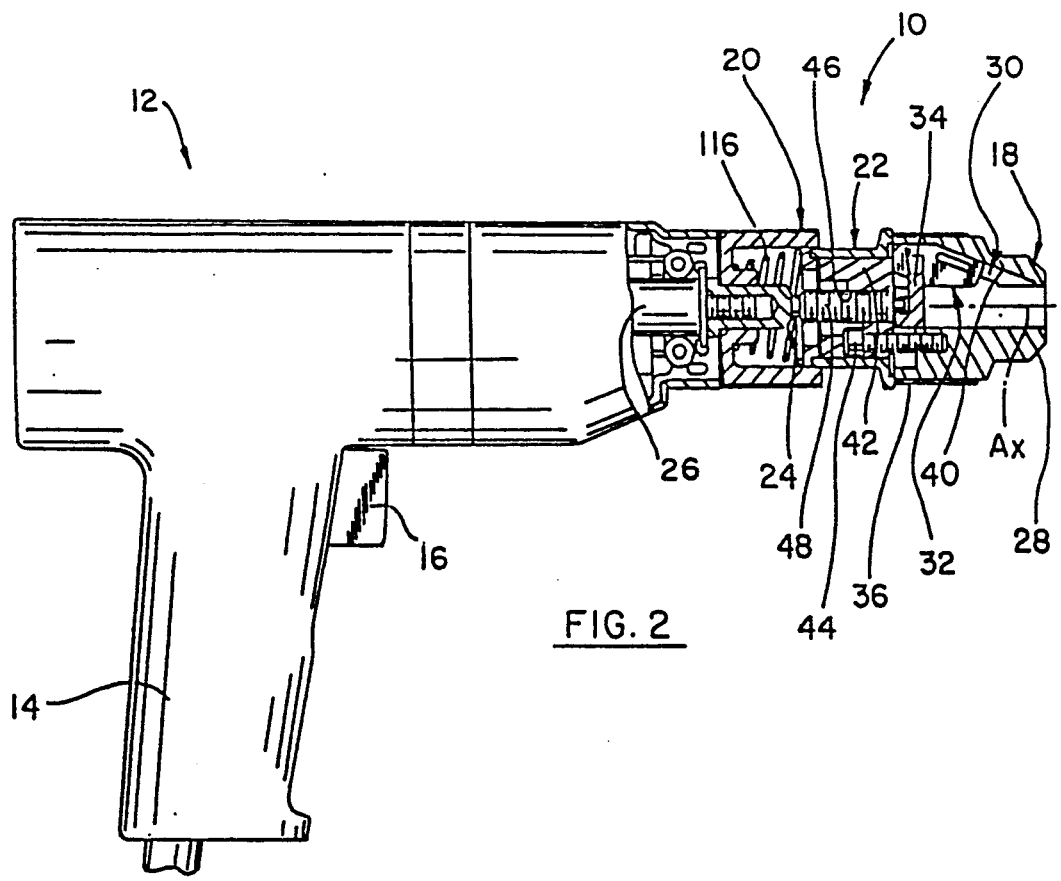
FIG. 2 is an enlarged cross-sectional view of keyless chuck of FIG. 1, the chuck of the type designed to be threaded onto and removed from the drive spindle of the electric drill.

The first embodiment, chuck 10, is shown in FIGS. 1 and 2 mounted on an exemplary conventional pistol-grip electric tool 12 having a handle 14 and trigger control switch 16. As shown in FIG. 1 and in the cross-sectional views of FIGS. 2-5, the keyless chuck 10 is defined about an axis $A_x$ and includes a jaw assembly 18, a chuck adjusting (or rear) sleeve 20, a control sleeve 22, and a main spindle 24.

Figure 3:
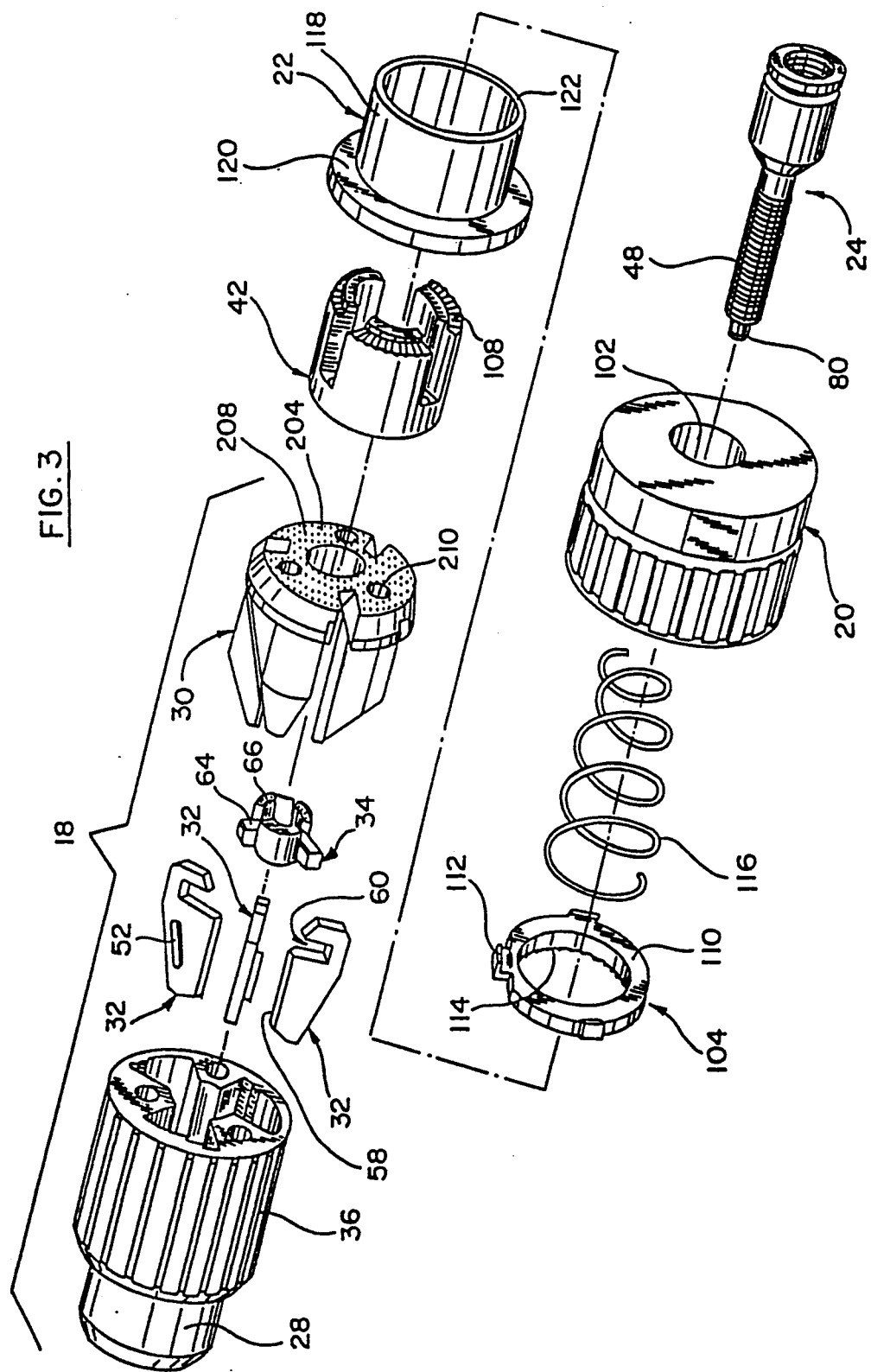
FIG. 3 is an exploded perspective of the keyless chuck of FIGS. 1 and 2.

As shown in FIGS. 1-5, the jaw assembly 18 includes a jaw housing 28 formed as a body of revolution about the axis $A_x$ and includes an external serrated gripping surface 36 (FIG. 1) to facilitate manual gripping and an interior bore 38 for accepting tool bits "T" of various diameters, as represented in dotted line illustration in FIG. 3. The jaw guide 30 is received within internal openings in the jaw housing 28 to define three guideways 40 that each receive a respective jaw 32 for controlled movement between, respectively, the retracted and advanced positions of FIGS. 3 and 4. The angle of inclination between the guideways 40 and the axis $A_x$ is selected as a function the intended application. A 30° angle has been found to be suitable for most consumer and commerical applications. A smaller angle will provide increased clamping force. The jaws 32 are connected to a jaw thrust member 34 which, in turn, is coupled to the end of the main spindle 24, as explained more fully below. A chuck adjusting nut 42 is secured to the rearwardly facing end of the jaw assembly 18 by threaded fasteners 44 and includes a threaded internal bore 46 in engagement with complementary threads 48 of the main spindle 24 so that rotation of the jaw assembly 18 about the axis $A_x$ in the direction indicated in FIG. 5 causes the jaws 32 to advance in the forward direction in their respective guideways 40 to grip a tool bit "T". Conversely, rotation of the jaw assembly 18 about the $A_x$ in the direction indicated in FIG. 4 will cause the jaw assembly 18 to move to the right relative to the main spindle 24 and cause the jaws 32 to retract rearwardly in their respective guideways 40 to loosen the grip on a tool bit "T".

The jaw housing 28 is preferably manufactured using powdered metal techniques and the jaw guide 30 is preferably manufactured from die-cast aluminum, zinc, or magnesium to present a rear face, as explained below, that is configured to deform during assembly of the chuck to accommodate any accumulated manufacturing tolerances and provide a finished chuck having minimal run-out.

As shown in FIGS. 6 and 7, the jaws 32 each include an inclined outwardly facing surface 50 that bears against the guideway 40 in the jaw housing 28, a laterally extending boss 52 that is retained within a trackway (not shown) of jaw guide 30, and converging surfaces 54 and 56 that define an inwardly facing edge 58 that is adapted to engage the outside diameter surface of a tool bit "T" in the usual manner. The angle between the tool engaging surface 58 and the inclined surface 50 is equal to the guideway 40 angle as discussed above. Each jaw 32 includes a slot 60 adjacent its rearward end for receiving a portion of the jaw thrust member 34 so that the jaws 32 move as a unit in response to relative movement of the jaw thrust member 34. In the preferred embodiment, the jaws 32 are fine-flow blanked from rolled sheet stock having preformed inclined converging jaw surfaces that are coined to their finished dimension to define the surfaces 54 and 56 and the tool bit engaging edge 58. The configuration of the jaws 32 provides a keyless chuck 10 having a "zero capacity", that is, a chuck which can tighten upon small diameter tool bits "T".

Figure 8:
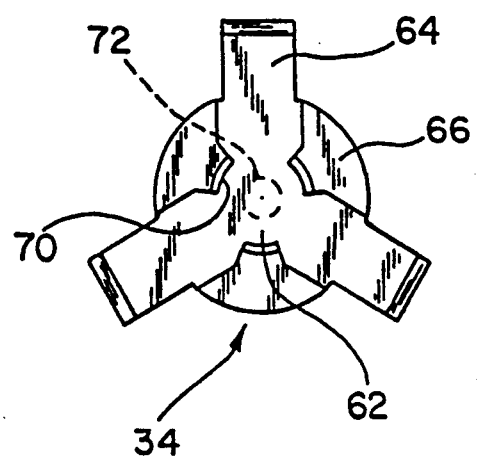
FIG. 8 is a plan view of a jaw thrust member.
Figure 9:
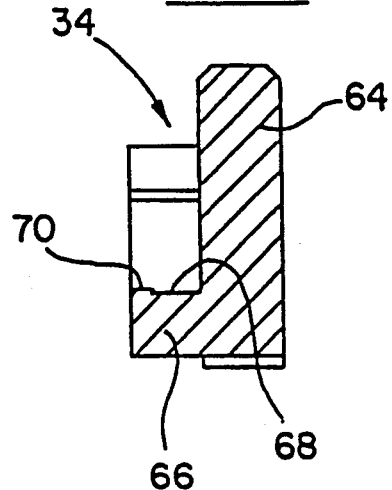
FIG. 9 is a cross-sectional view of the thrust member of FIG. 8.
Figure 10:
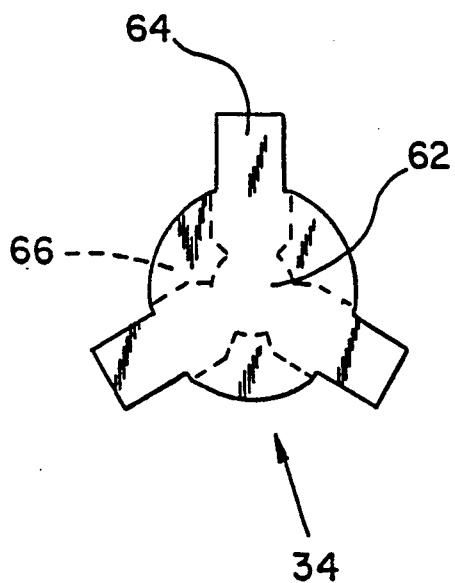
FIG. 10 is a view of the jaw thrust member of FIGS. 8 and 9 from the side opposite that shown in FIG. 10.

As shown in FIGS. 8, 9, and 10, the jaw thrust member 34 includes a central portion 62 and three radially outward extending and equi-spaced arms 64. Three upstanding sections 66 are provided between the arms 64 and define a central opening for engaging a projection at the end of the main spindle 24 as explained below. The inwardly facing surfaces of the upstanding sections 66 include a first surface 68 formed at a first diameter and second surface formed at a somewhat smaller diameter to define an inwardly facing rim 70, as shown in FIG. 9, at the upper edge of the upstanding sections 66. As explained below, the upstanding sections 66 constrain the remote end of the main spindle 24 to engage a small-area contact patch 72 (dotted line illustration in FIG. 8) to apply a thrust force against the jaw thrust member 34 which, in turn, applies the thrust against the jaws 34 to forcibly advance or retract the jaws 32.

The main spindle 24, shown in partial cross-section in FIG. 11, includes an enlarged diameter portion 74 at its rearward section having an internal threaded bore 76 for engaging the threaded drive spindle 26 (FIG. 2) of the pistol-grip electric drill 12 in the usual manner. A reduced diameter axially extending section 78 carrying the threads 48 extends forwardly of the enlarged diameter section 74 and carries the threads 48 for engaging the chuck adjusting nut 42 as described above. The main spindle 24 includes a projection, indicated generally at 80, at its remote end for engaging the jaw thrust member 34. The projection 80 is defined by a reduced diameter portion 82, a somewhat enlarged rim 84, a conically tapered portion 86, and, lastly, a flat forwardly facing thrust surface 88.

As shown in the enlarged detail of FIG. 12 and in FIGS. 3 and 4, the projection 80 extends between the inwardly facing surfaces of the upstanding sections 66 of the jaw thrust member 34 with the outside diameter of the rim 84 of the projection somewhat larger than the inside diameter of the rim 70 of the jaw thrust member 34 so that the projection 80 must be forced between the upstanding sections 66 to allow the remote end of the projection 80 to 'snap' into engagement with the jaw thrust member 34 and thus releasably retain the two parts together while allowing relative rotation. The flat thrust surface 88 of the projection 80 is designed to bear against the small-area contact patch 72 (shown in FIG. 8) of the jaw thrust member 34 to apply a thrust force to the jaw thrust member 34 and, in turn, apply the thrust force to the jaws 32 through the radially extending arms 64. In general, the contact patch 72 surface area is, of course, smaller than the cross-sectional area of the main spindle 24 (preferably 10 mm) and is preferably defined by a diameter dimension of 3 mm or less. A contact patch area as small as possible is preferred. The remote end of the main spindle 24 is preferably induction hardened and the jaw thrust member may be made of powdered metal or preferably of precision blanked steel to provide contacting surfaces of sufficient hardness to accommodate the expected stresses.

The provision of a small-area contact patch 72 between the remote end of the main spindle 24 and the jaw thrust member.34 contributes to a reduction of the internal friction in the keyless chuck 10 since any forces developed as a consequence of relative rotation between the main spindle 24 and the jaw thrust member 34 are located at relatively small radii from the axis $A_x$ and, accordingly, the torque and the contribution to the operating friction of the keyless chuck 10 will be low. The low operating friction of the chuck is further enhanced by the use of a small diameter spindle 24 compared with the outer diameter of the chuck. The spindle threaded portion preferably has an outer diameter of 8-10 mm compared with a chuck outer diameter of 40-50 mm. The large ratio enhances the leverage of the operator when tightening and loosening the jaws on a bit.

The chuck adjusting sleeve 20, as shown in FIGS. 13, 14, and 15, includes an outer cylindrical section 90, an endwall 92 at its rearward end, and an inner cylindrical extension 94 that is formed coaxially with the operating axis $A_x$ of the chuck 10. The cylindrical section 90 includes three longitudinally extending slots 96 formed on its inner wall surface for engaging a locking plate, as explained below, and a series of longitudinal striations 98 on its exterior surface to facilitate manual gripping of the adjusting sleeve 20. A pair of parallel flats 100 are formed on the exterior surface of the adjusting sleeve 20 (FIG. 13) adjacent the endwall 92 to facilitate gripping with a wrench or similar tool. The inner cylindrical extension includes a through bore 102 that accepts the enlarged diameter portion 74 of the main spindle 24 with an interference fit to secure the chuck adjusting sleeve 20 and the main spindle 24 together. If desired, additional locking devices, including various types of snap-rings and clips, may be used to assist in securing the components together.

As shown in FIGS. 3 and 4, the main spindle 24 and the chuck adjusting sleeve 20 are secured to the drive spindle 26 with the reduced diameter portion 78 of the main spindle 24 in threaded engagement with the chuck adjusting nut 42 so that rotation of the jaw assembly 18 and the connected jaw adjusting nut 42 relative to the chuck adjusting sleeve 20 will advance or retract the jaws 32 in the jaw housing 28.

Figure 17A:
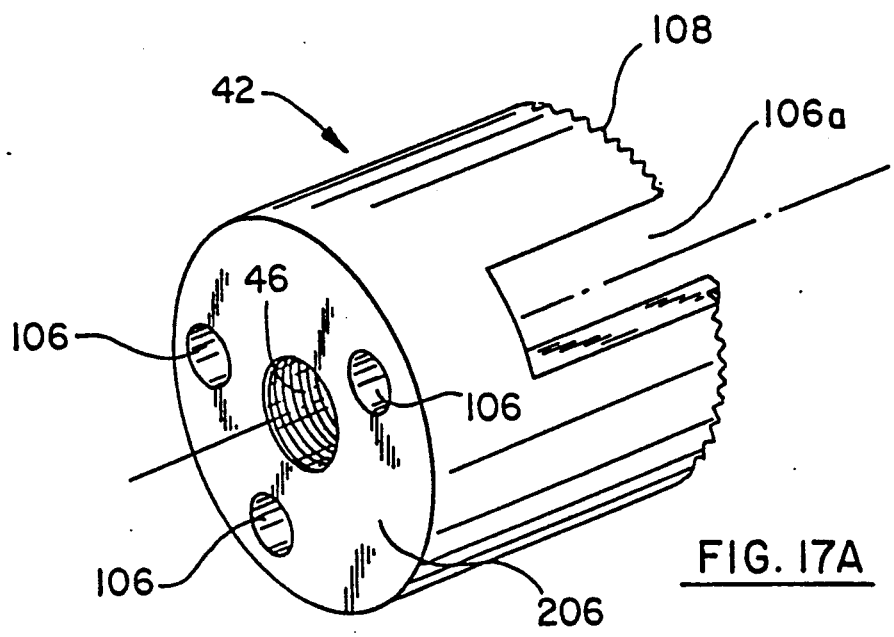
FIG. 17A is an isometric view of the chuck adjusting nut of FIGS. 16 and 17.
Figure 17B:
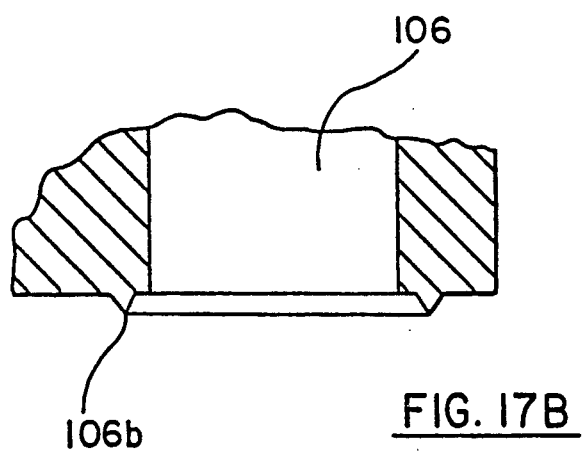
FIG. 17B is a detailed view, in cross-section, of the chuck adjusting nut of FIG. 17 taken along line 17B—17B of FIG. 17.

In accordance with one feature of the present invention, the keyless chuck 10 includes a locking mechanism which allows the chuck adjusting sleeve 20 and the jaw assembly 18 to be rotated relative to one another to allow hand-tightening of the chuck or self-tightening in response to torque transmitted through the chuck and which can be controlled by the operator to prevent counter rotation tending to loosen the chuck during reverse operation. Additionally, the locking mechanism can lock the chuck adjusting sleeve 20 and jaw assembly 18 from rotation in either direction and, in one form of the invention, can be selectively enabled or disabled by the operator. As shown in FIGS. 16–20, the lock mechanism includes the chuck adjusting nut 42, described above, and a lock plate 104. The chuck adjusting nut 42 (FIGS. 16–17B) includes the central threaded bore 46 that engages the reduced diameter portion of the main spindle 24, as described above, and a plurality of bores 106 through which the threaded fasteners 44 secure the chuck adjusting nut 42 to the jaw assembly 18. The bores 106 are distributed about the central axis of the chuck adjusting nut 42 in an unequal angular distribution so that the chuck adjusting nut 42 and the jaw assembly 18 can be assembled in a unique relationship to allow the chuck 10 to be disassembled, serviced, and reassembled without loss of the as-manufactured run-out, as described more fully below. In the preferred embodiment and as shown in FIG. 16, the bores 106 are spaced apart by unequal angular spacings A1, A2, and A3 with the angular spacing A1 equal to 120°, the angular spacing A2 equal to 115°, and the angular spacing A3 equal to 125°. The rearwardly facing end of the chuck adjusting nut 42 is provided with a circular pattern of radially aligned teeth 108 which cooperate with the lock plate 104 to effect the unidirectional or bi-directional locking function. As shown in FIGS. 17 and 17A, the tooth pattern is interrupted by clearance slots 106a for the threaded fasteners 44. Additionally and as shown in the detail of FIG. 17B, annular rims 106b surround each of the bores 106 and project a small distance (e.g., 0.005 inch) from the forward face of the chuck adjusting nut 42. Preferably, to prevent relative rotation of nut 42 and jaw assembly 18, the annular rims 106b have a triangular profile with a forwardly pointing edge penetrating the deformable rear surface of the jaw assembly 18 during manufacture of the keyless chuck 10, as described below.

The lock plate 104 (FIGS. 18–20) includes a circular, ring-like portion 110 with three tabs 112 extending radially outward from the circumferential edge of the circular portion 110. A series of radially aligned teeth 114 are provided on one face of the ring-like portion 110 and are designed to selectively engage the teeth 108 on the chuck adjusting nut 42 as explained below. The lock plate 104 is received within the chuck adjusting sleeve 20 with its teeth 114 facing forwardly and the tabs 112 received within the slots 96 (FIGS. 14 and 15) formed on the interior of the chuck adjusting sleeve 20. As shown in FIGS. 3, 4, and 5, a helical coil spring 116 is contained within the chuck adjusting sleeve 20 and resiliently biases the lock plate 104 in the forward direction.

Figure 21:
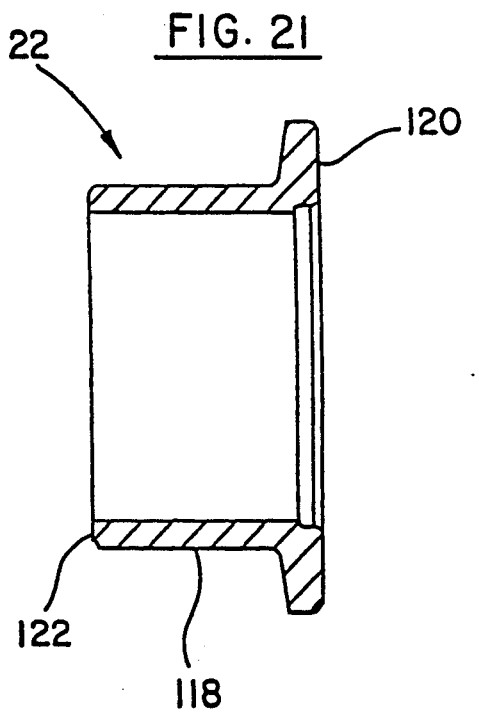
FIG. 21 is a side view, in cross-section, of a control sleeve.

The control sleeve 22 is journalled on the outside diameter of the chuck adjusting nut 42 between the rear face of the jaw assembly 18 and the lock plate 104 and is freely rotatable about the chuck adjusting nut 42. As shown in FIG. 21, the control sleeve 22 includes an extended tubular section 118 and a radially outward extending flange 120 at its forward end. The opposite end 122 of the tubular section 118 normally abuts the lock plate 104 which is then effective to resiliently bias the flange 120 against the rear face of the jaw assembly 18 in response to the force applied by the helical coil spring 116.

As shown in FIGS. 4 and 5, the control sleeve 22 is normally biased in the forward direction by the spring-biased lock plate 104 to allow the teeth 114 on the lock plate 104 to engage the mating teeth 108 formed on the rearwardly facing end of the chuck adjusting nut 42. The control sleeve 22 is rotatably mounted on the chuck adjusting nut 42 and, as shown in solid and dotted line illustration in FIG. 4, can be moved by the operator from a forward position against the biasing force of the spring 116 to a rearward position to disengage the teeth 114 of the lock plate 104 from the teeth 108 of the chuck adjusting nut 42. As explained below, the selection of the profile of the teeth 108 and 114 as well as the force applied by the spring 116 can be selected to control the chuck to fully lock the jaw assembly 18 from rotation relative to the chuck adjusting sleeve 20 in either the forward or reverse direction, to allow relative rotation in the forward direction only in response to hand tightening of the chuck as well as torque transmitted through the chuck, and to selectively enable or disable the locking function.

FIG. 22 illustrates a first tooth profile for the teeth 114 of the locking plate 104 and the teeth 108 of the chuck adjusting nut 42. As shown, each tooth includes a relatively steeply pitched flank 120, a relatively shallow pitch flank 122, and a flat crest 124. The lock plate 104 is resiliently urged downward in FIG. 22 by the urging force of the spring 116 so that the teeth 114 and 108 interengage. When the jaw assembly 18 and the connected chuck adjusting nut 42 are rotated in the direction indicated, for example, when hand-tightening the chuck on a tool bit "T", the profile of the teeth 114 and 108 permit relative rotation to allow the jaws 32 to tighten on the tool bit "T". Conversely, the tooth profile prevents any counter rotation which would tend to loosen the grip on the tool bit "T". Additionally, the tooth profile configuration allows the chuck to self-tighten in response to torque transmitted through the chuck 10 from the drive spindle 26 to the tool bit "T".

More specifically, as the tool bit "T" engages a work piece, a reaction torque is developed that tends to rotate the jaw assembly 18 about the main spindle 24 to advance the jaws 32 and cause them to tighten their grip on the tool bit "T". As this relative rotation takes place, the teeth 114 and 108 increment relative to one another to new relative positions. Since the tooth profile of FIG. 22 prevents reverse rotation of the jaw assembly 18 relative to the chuck adjusting sleeve 20, there is no tendency for the keyless chuck 10 to loosen, even if the direction of the drive spindle 26 is reversed. In order to release the tool bit "T", the control sleeve 22 is manually grasped and pulled rearwardly against the resilient urging force of the spring 116 to fully disengage the lock plate 104 from the end of the chuck adjusting nut 42. When the lock plate 104 and the chuck adjusting nut 42 are disengaged, the jaw assembly 18 can be counter rotated relative to the chuck adjusting sleeve 20 to cause the jaw assembly 18 to advance forwardly relative the main spindle 24 and retract the jaws 32 to thus loosen the grip on the tool bit "T".

The tooth profile of FIG. 22 is well-suited for use in consumer-type power tools where the ultimate torque provided by the tool is sufficient to allow the keyless chuck 10 to fully self-tighten without danger of over-tightening or lock-up. In the case of industrial power tools, however, the ultimate torque provided by the tool can be sufficient to allow the keyless chuck 10 to over-tighten and distort components within the chuck or cause the jaws 32 to crush the surface of the tool bit "T".

FIG. 23 illustrates a second tooth profile suitable for use on industrial grade tools where it is desirable to 'lock' the keyless chuck 10 from rotation in either direction. As shown, the teeth 114' and 108' have identical steeply inclined flanks 126 and 128 and a flat crest 130. When the teeth 114' and 108' are interengaged, any torque transmitted through the keyless chuck 10 will be insufficient to allow the teeth 114' and 108' to increment relative to one another to allow self-tightening in the forward direction or, conversely, loosening in the reverse direction. Where the tooth profile of FIG. 23 is used, the keyless chuck 10 is hand-tightened by first pulling the control sleeve 22 rearwardly to disengage the lock plate 104 from the chuck adjusting nut 42 and is maintained in that position while rotating the jaw assembly 18 relative to the chuck adjusting sleeve 20 until the jaws 32 tighten on the tool bit "T". After hand-tightening is accomplished, the control sleeve 22 is released to allow the spring 116 to urge the lock plate 104 forwardly to engage the teeth 108' and 114'. In this situation, the angle of the guideway 40 of the jaw housing 28 relative to the axis $A_x$ is chosen so that hand-tightening of the keyless chuck 10 applies sufficient gripping force to prevent the tool bit "T" from slipping relative to the jaws 32 when the tool's full torque capacity is utilized in either the forward or reverse direction. The tooth pattern of FIG. 23 thus prevents self-tightening when applying torque in the forward direction or loosening when operating in the reverse direction.

A third tooth profile is shown in FIG. 24 and functions to allow the keyless chuck 10 a measure of incremental self-tightening before self-locking. As shown in FIG. 24, the lock plate 104 is provided with teeth 114" having a relatively steep flank 132, another flank defined by surfaces 134 and 136, and a flat crest 138. The chuck adjusting nut 42 is configured with a profile complementary to that of the teeth 114" to define a series of recurring indentations I1 and I2 with the indentation I1 having a first depth d1 and the indentation I2 having a second depth d2. As shown, the indentation I1 includes an inclined surface 140 designed to engage the surface 136, and the indentation I2 includes the surface 140 for engaging the surface 136 of the tooth 114" and another surface 144 for engaging the surface 134 of the tooth 114". When the control sleeve 22 is released after hand-tightening of the keyless chuck 10, the tooth 114" will advance into indentation I1 so that the surface 136 will engage the surface 140. In this configuration, any additional torque transmitted through the chuck 10 in response to the application of the tool bit "T" to the work piece will cause the chuck adjusting nut 42 to rotate to the right in FIG. 24, as indicated by the arrow, effecting a proportional self-tightening of the keyless chuck 10 and causing the tooth 114" to 'ride' upwardly on the surface 140 of indentation I1 and move along the surface 142 between the indentations to indentation I2 where the tooth 114" will enter indentation I2 with the surface 136 engaging the surface 140 and the surface 134 engaging the surface 144. Since the indentation I2 has a greater depth dimension d2, a further increase in the torque transmitted through the keyless chuck 10 will be ineffective to cause further incrementing and self-tightening. As can be appreciated, the tooth profile of FIG. 24 allows for hand-tightening of the chuck on the tool bit "T" and a limited amount of self-tightening of an under-tightened chuck in response to torque transmitted through the keyless chuck 10.

Figure 26:
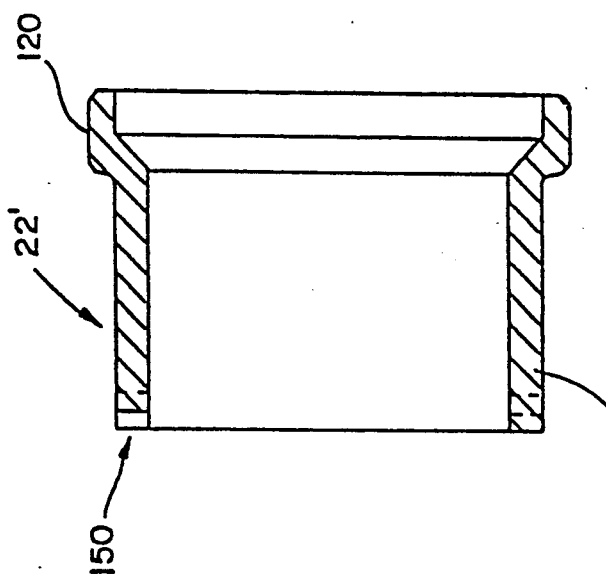
FIG. 26 is a side view, in cross-section, of the control sleeve of FIG. 25.
Figure 27:
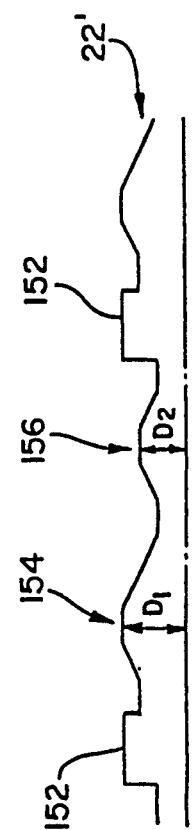
FIG. 27 is a detailed view of a cam profile of the control sleeve of FIGS. 25 and 26.
Figure 25:
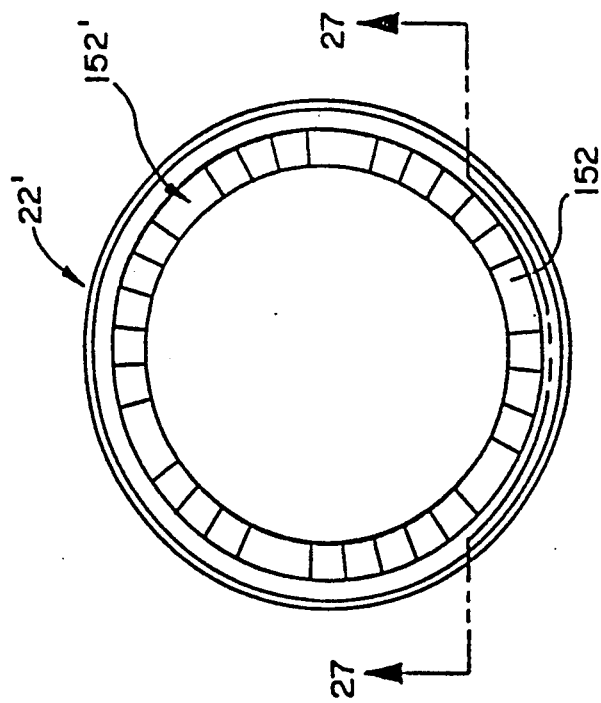
FIG. 25 is an end view of a second embodiment of a control sleeve.

In the embodiment described above, the control sleeve 22 is normally urged in the forward direction with the spring 116 pushing the lock plate 104 into engagement with the chuck adjusting nut 42. In order to temporarily disengage the lock plate 104 from the chuck adjusting nut 42, the operator pulls the control sleeve 22 rearwardly against the force of the spring 116. A second embodiment of a control sleeve 22' and modified lock plate 104' are illustrated in FIGS. 25-30. As shown in FIGS. 25-27, the control sleeve 22' is similar in overall configuration to the control sleeve 22 of FIG. 21 and includes an axially extending tubular section 118, a radially enlarged portion 120 at its forward end, and a lock plate camming surface 150 at its rearward end. As shown in FIG. 27, the camming surface 150 includes a series of spaced apart axially extending tabs 152 with a first cam 154 and a second cam 156 located between each set of tabs 152. As shown, each of the cams 154 and 156 has respective rising cam surfaces and a flat dwell surface with the cam 154 having a relatively higher dwell surface than the cam 156.

The lock plate 104' is similar in structure as that shown in FIGS. 18-20 and includes a ring-like portion 110 having three radially extending tabs 112 and a series of radially aligned teeth 114 on one side surface. As shown in FIG. 29, the lock plate 104' also includes three equi-spaced cam formations 160 radially outward of the teeth 114. As shown in FIG. 29, the cam formations 160 each include oppositely inclined cam surfaces 162 and 164 and an intermediate surface 166.

The control sleeve 22' and lock plate 104' are assembled with the other components of the keyless chuck 10 in the manner described above so that the axially extending tabs 152 of the control sleeve 22' lie on opposite sides of the cam formation 160 of the lock plate 104', as shown in FIG. 30. The control sleeve 22' is thus rotatable about the chuck adjusting nut 42 between a first position, shown in FIG. 30, in which the cam formation 160 of the lock plate 104' engages the cam 154 of the control sleeve 22', and a second position (not shown) in which the cam formation 160 engages the cam 156. When the control sleeve 22' is in the first position, the larger height D1 of the cam 154 is effective to disengage the lock plate 104' of the chuck adjusting nut 42 and thus disable the locking effect of the teeth on the lock plate 104' and the chuck adjusting nut 42. Conversely, when the control sleeve 22' is rotated to the second position in which the cam formation engages the cam 156, the relatively smaller height D2 allows the teeth 114 on the lock plate 104' to engage the cam adjusting nut 42 to enable the locking mechanism for operation.

As can be appreciated, the control sleeve 22' and lock plate 104' of FIGS. 28 to 30 allow disengagement of the locking mechanism by either pulling the control sleeve 22' rearwardly in the manner described above or by disabling or enabling the locking mechanism in response to rotation of the control sleeve 22' in one direction or the other.

Figure 31:
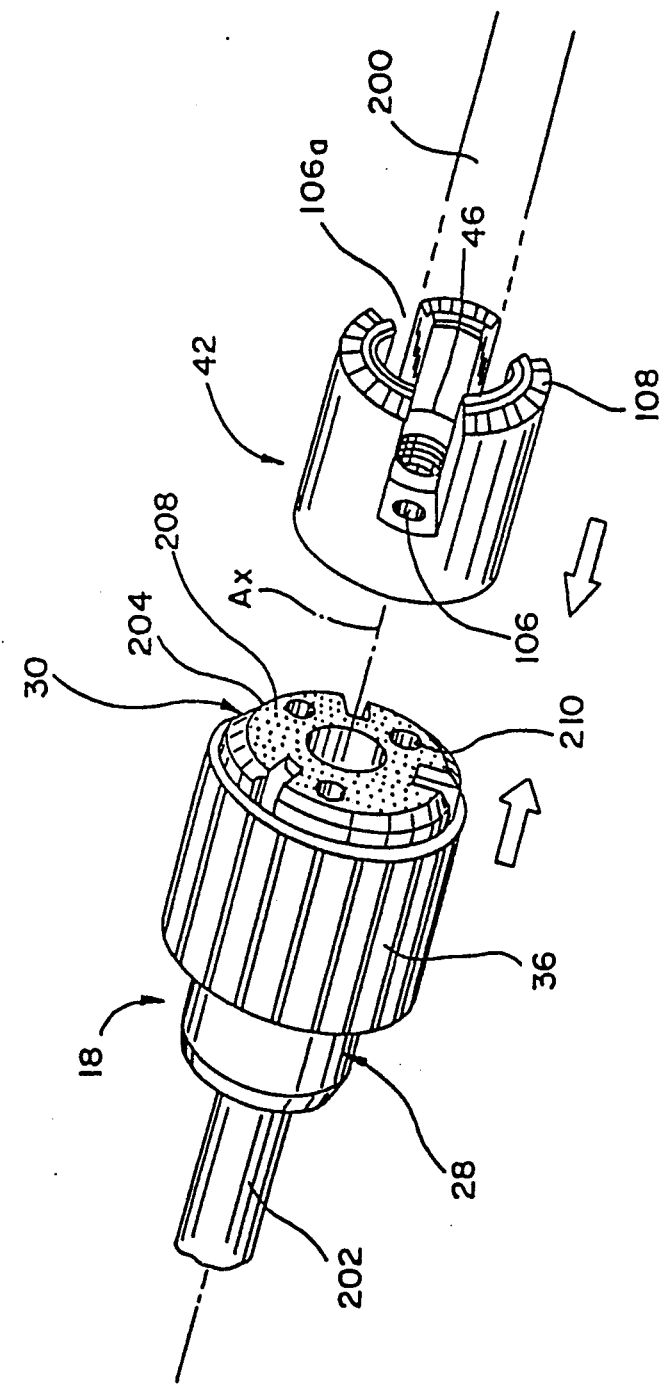
FIG. 31 is an isometric projection of jaw assembly and chuck adjusting nut mounted on mandrels as part of the assembly method.
Figure 33:
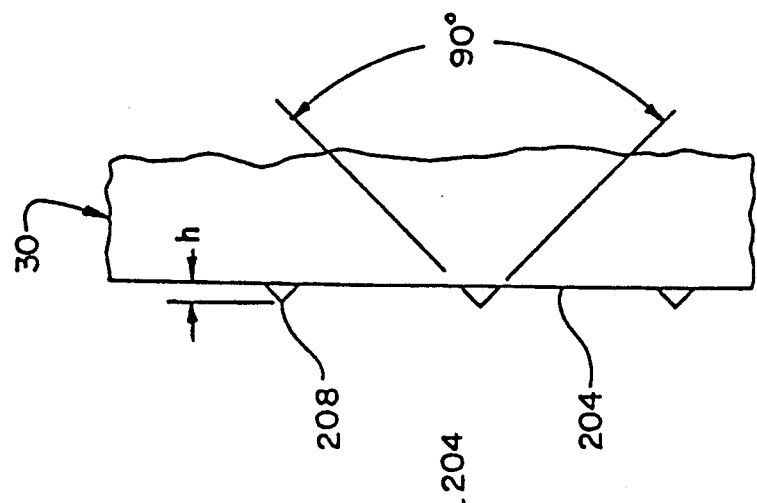
FIG. 33 is a side view of the surface shown in FIG. 32.

The major components of the keyless chuck 10 are assembled using a method by which the as-manufactured chuck has a very low run-out and which also allows the chuck to be repeatedly disassembled, serviced, and re-assembled without deterioration of the as-manufactured run-out. As shown in FIG. 31, the chuck adjusting nut 42 and the jaw assembly 18 are mounted on respective precision mandrels 200 and 202 that are in precise alignment with one another along the principal chuck axis $A_x$. The mandrels 200 and 202 are preferably of the expanding type and locate on axial bore surfaces of the respective components. For example, the mandrel 200 locates on the threaded bore 46 of the chuck adjusting nut 42, and the mandrel 202 locates on the interior bore 38 of the jaw assembly 18. When mounted on their respective mandrels 200 and 202, the chuck adjusting nut 42 and the jaw assembly 18 are thus in optimum axial alignment. As described above in connection with FIG. 3, the jaw assembly 18 is assembled, in part, from the jaw housing 28 and the jaw guide 30. While the chuck adjusting nut 42 and the jaw housing 28 are preferably manufactured using powdered metal techniques to provide precision surfaces and the jaw guide 30 is manufactured from a precision die-cast metal, such as aluminum, the accumulated tolerances of the components may be such that the mating surfaces of the chuck adjusting nut 42 and the jaw assembly 18 components, that is, the forward face 206 (FIG. 17A) of the chuck adjusting nut 42 and rearward face 204 of the jaw assembly 18 may be less than transverse to the principal axis $A_x$ and, accordingly, can contribute to the as-manufactured run-out of the chuck.

Figure 32:
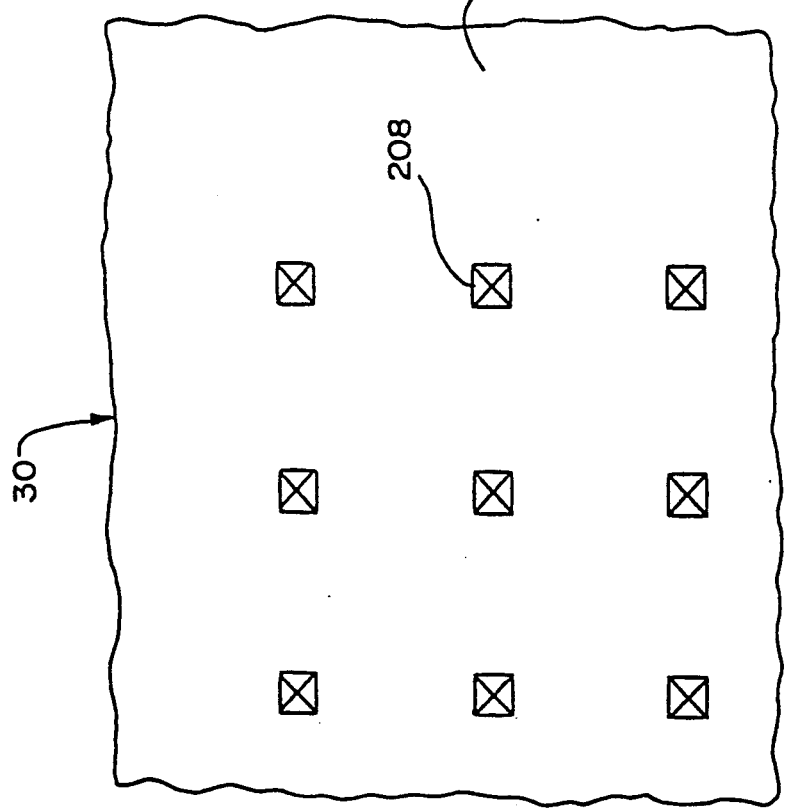
FIG. 32 is a detailed plan view of a rear surface portion of the jaw guide illustrating a plurality of deformable pyramids.

In order to minimize run-out during the initial assembly of the chuck during manufacture, one of the two mating surfaces, such as the rearward surface 204 of the jaw assembly 18 is defined by a deformable material. The jaw guide 30 (FIG. 3) is preferably fabricated from aluminum or zinc magnesium and presents the surface 204, as shown in FIG. 31. In the alternative, a separate spacer disc or washer (not shown) having the desired characteristics can be provided. As shown in FIGS. 31 and 32, the surface 204 is provided with numerous pyramidal structures 208 extending upwardly from the surface 204. The structures are preferably formed as 4-sided pyramids having a height 'h' of between 0.005 and 0.015 inches and an included angle of 90°. The pyramids 208 are formed in a rectangular array although other patterns are suitable. The pyramids 208 are designed to present a deformable or crushable surface to the forwardly facing surface 206 of the chuck adjusting nut 42 and are preferably formed in during the die-casting of the jaw guide 30.

During the assembly of the keyless chuck 10, the chuck adjusting nut 42 is mounted on its mandrel 200 and the jaw assembly 18 is mounted on its mandrel 202. As indicated above, the mandrels 200 and 202 are precisely located on the principal axis $A_x$ of the chuck and thus co-align the chuck adjusting nut 42 and the jaw assembly 18 and position the surfaces 204 and 206 in a confronting relationship. While the rearwardly facing surface 204 of the jaw assembly 18 and the mating, forwardly facing surface 206 of the chuck adjusting nut 42 are nominally transverse to the principal axis $A_x$, manufacturing tolerances are such that these two surfaces may vary from their ideal transverse relationship. In this situation, were the two surfaces secured to together, the major axis of the chuck adjusting nut 42 would be skewed somewhat relative to that of the jaw assembly 18. Any tool bit "T" gripped by the jaw assembly 18 would then wobble about the principal $A_x$. In accordance with the present invention, the chuck adjusting nut 42 and the jaw assembly 18 are forced together, for example, under hydraulic pressure, while positionally constrained by the mandrels 200 and 202 to insure precise co-alignment of their respective major axes with the principal axis $A_x$. Where the surface 204 of the jaw assembly 18 and the surface 206 of the chuck adjusting nut 42 are not transverse to the principal axis $A_x$, that is, the surfaces 204 and 206 are non-parallel, the forcible engagement of the two surfaces 204 and 206 will cause selective crushing of the pyramid structures 208. More specifically and depending upon the initial non-transverse alignment of the surfaces 204 and 206, some of the pyramid structures 208 will be substantially crushed while others will be minimally crushed. As a result, an interface is created which is unique to each chuck adjusting nut 42 and jaw assembly 18 to accommodate their unique dimensional characteristics while precisely aligning the chuck adjusting nut 42 and its jaw assembly 18 along the principal axis $A_x$. To retain the unique interface of surfaces 204, 206 producing precise alignment, annular rims 106B (FIG. 17B) penetrate into surface 204 and prevent any relative rotation between surfaces 204, 206 during use of the chuck. Any relative rotation would cause a variation in the precise axial alignment of the parts which is achieved during initial assemble.

As explained above in relationship to FIG. 16, the bores 106 that accept the threaded fasteners 44 that retain the chuck adjusting nut 42 and the jaw assembly 18 together are asymmetrically aligned so that the chuck adjusting nut 42 and the jaw assembly 18 can be assembled in one and only one relative angular relationship. Also, rims 106B will readily reseat in the mating deformations in surface 204 so that precise alignment is again achieved. Thus, when the chuck adjusting nut 42 and the jaw assembly 18 are assembled in the manner described above, the resultant keyless chuck 10 has minimal run-out and can also be repeatedly disassembled and cleaned or otherwise serviced and re-assembled without loss or degradation of the original, as-manufactured run-out.

While pyramid structures 208 have been shown in the preferred embodiment, other surface configurations that provide the intended function are suitable, including various types of 'waffle' patterns. In general, the deformable structure of elements must have sufficient height 'h' to accommodate the expected range of misalignment of the surfaces 204 and 206 and be sufficiently spaced from one another to allow the deformed material to flow laterally.

As shown in FIGS. 34-43, the second and preferred embodiment incorporates five basic improvements to the structure and operation of a chuck in accordance with the first embodiment, namely, (1) forwardly spring biased jaws for gripping a bit inserted in the chuck, (2) a lock assembly for preventing excessive tightening or loosening of the jaws on a bit mounted in the chuck, (3) an automatic tightener for tightening a bit in the jaws when use is initiated, (4) a deformable interface between the spindle and the carrier for aiding in the alignment of the chuck components during assembly, and (5) a spindle/nut design for more accurate alignment.

As shown in FIGS. 34-43, chuck 301 comprises a jaw assembly 303, a threaded spindle 305, a rear sleeve 307 press fitted on spindle 305 and a lock assembly 309 intermediate rear sleeve 307 and jaw assembly 303. Jaw assembly 303 includes a jaw housing 311 having a forwardly disposed opening 313 for receiving a bit 315, a central guideway 317, a plurality of jaw guideways 319, 321, 323 and a longitudinal axis $A_x$.

Spring Biased Jaws

Figure 34:
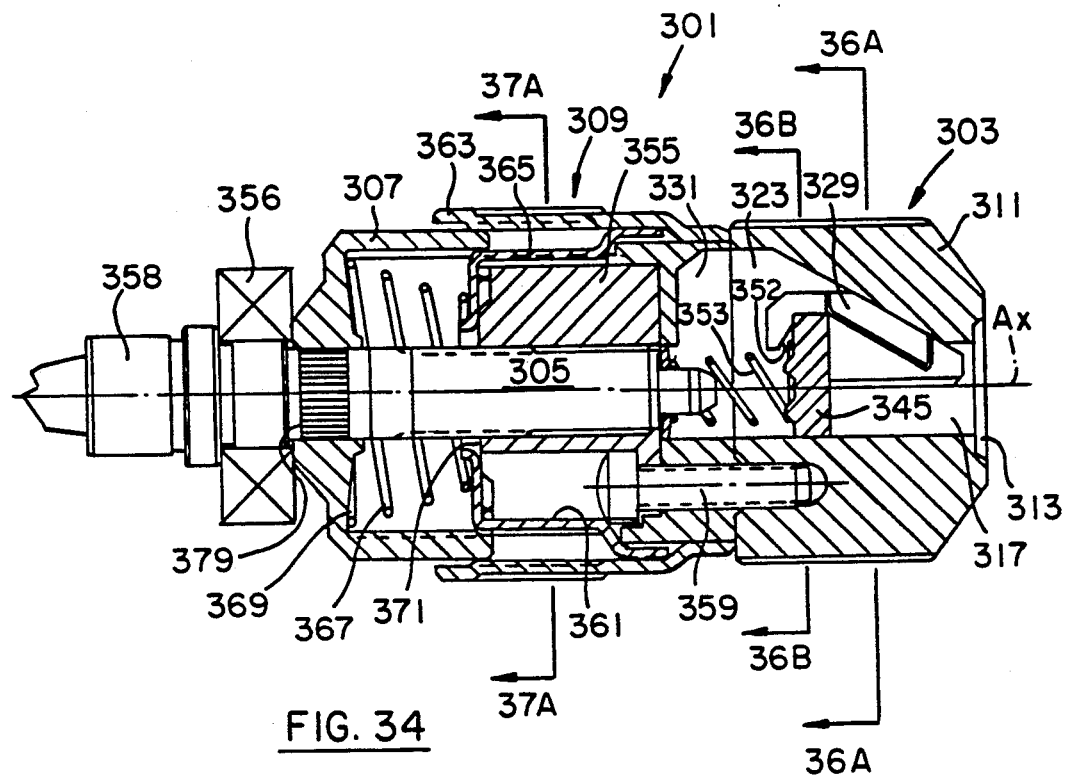
FIG. 34 is a longitudinal cross-sectional view of a keyless chuck in accordance with a second embodiment of the invention with the jaws shown in a normally closed position.
Figure 35:
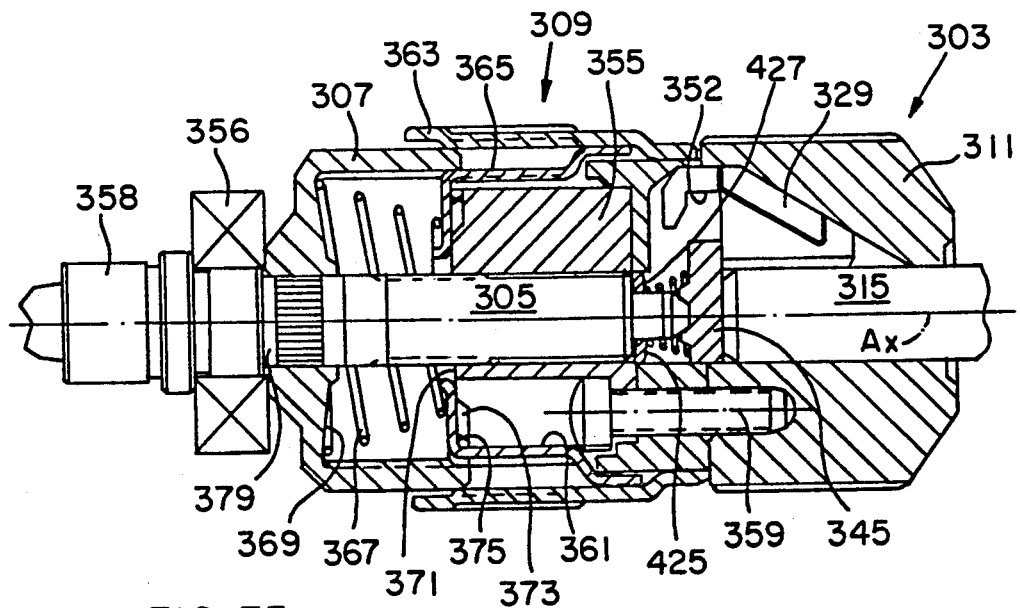
FIG. 35 is a longitudinal cross-sectional view of the chuck of FIG. 34 shown with a tool bit clamped within the jaws.
Figure 36A:
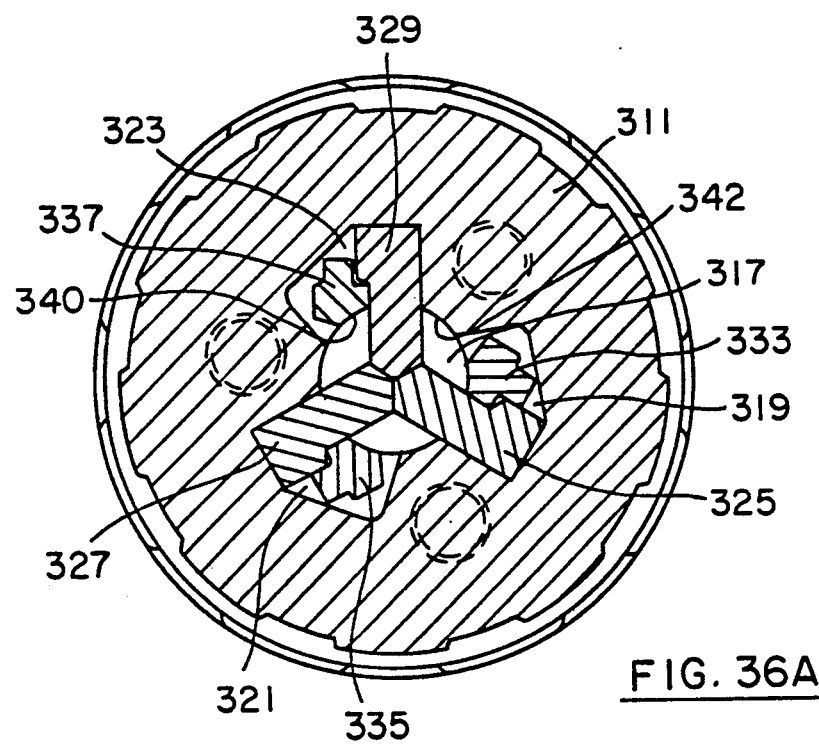
FIG. 36A is a transverse cross-sectional view of the chuck shown in FIG. 34 taken along line 36—36A.
Figure 36B:
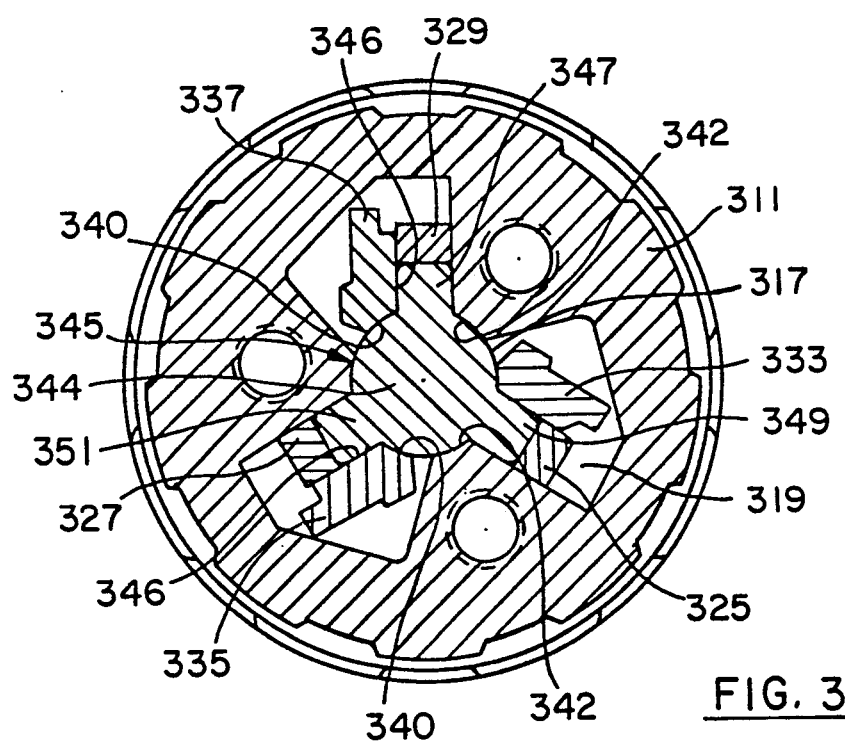
FIG. 36B is a transverse cross-sectional view of the chuck of FIG. 34 taken along line 36B—36B.

In accordance with one feature of the invention, a plurality of spring biased jaws 325, 327, 329 are slidably mounted in the respective jaw guideways 319, 321, 323 between a rearward opened position (FIG. 35) and a forward closed position (FIG. 34). The jaw guideways 319, 321, 323 are also partially formed by a divider 331 fitted into the rear end of jaw housing 311. Divider 331 (FIGS. 36, 38B, 38C, 38D) has three upstanding walls 333, 335, 337 which serve to space and guide movement of jaws 325, 327, 329 and has three spaced recesses 339, 341 and 343 to receive the base of a respective jaw 325, 327, 329. In FIGS. 34, 35; portions of divider 331 are omitted for clarity. A carrier 345 (FIGS. 34, 36B) is engaged with jaws 325, 327, 329 and is slidably mounted in central guideway 317 for maintaining each jaw in the same relative axial location. Guideway 317 (FIG. 36B) is defined by internal arcuate guide surfaces 342 in jaw housing 311. Arcuate surfaces 340 on walls 333, 335, 337 are spaced slightly from guideway 317 and do not contact carrier 345 during fore and aft movement in guideway 317. Carrier 345 (FIGS. 34, 36B, 39A, 39B) includes a cylindrical hub 344 guided by surfaces 342 and three radially extending spokes 347, 349, 351 guided by sides 346 of walls 333, 335, 337. Spokes 347, 349, 351 are received respectively within a slot 352 formed in the base of each jaw 325, 327, 329. As shown by comparing FIGS. 34, 35, forward movement of jaws 325, 327, 329 move each jaw toward longitudinal axis $A_x$ and increases the penetration of each lobe 347, 349, 351 respectively within slots 352. Jaws 325, 327, 329 are forwardly biased into a closed position by a biasing means 353. Biasing means 353 is preferably a coil spring.

Figure 38A:
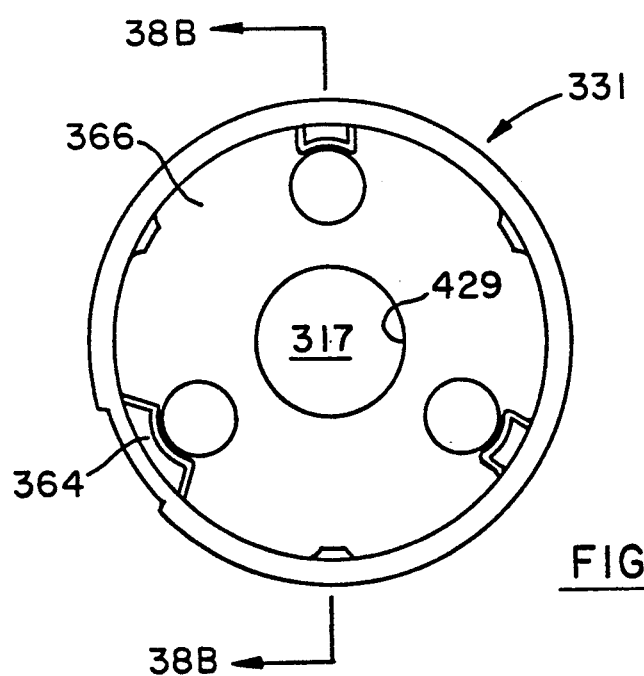
FIG. 38A is a rear elevational view of a jaw divider for the chuck shown in FIG. 34 taken along line 38A—38A of FIG. 38B.
Figure 38B:
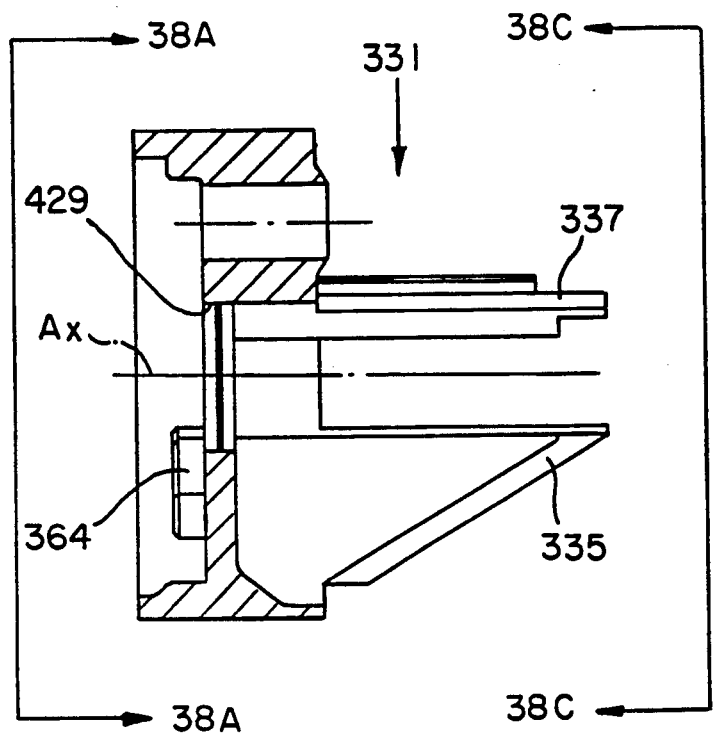
FIG. 38B is a longitudinal cross-sectional view of the divider shown in FIG. 38A taken along line 38B—38B.
Figure 38C:
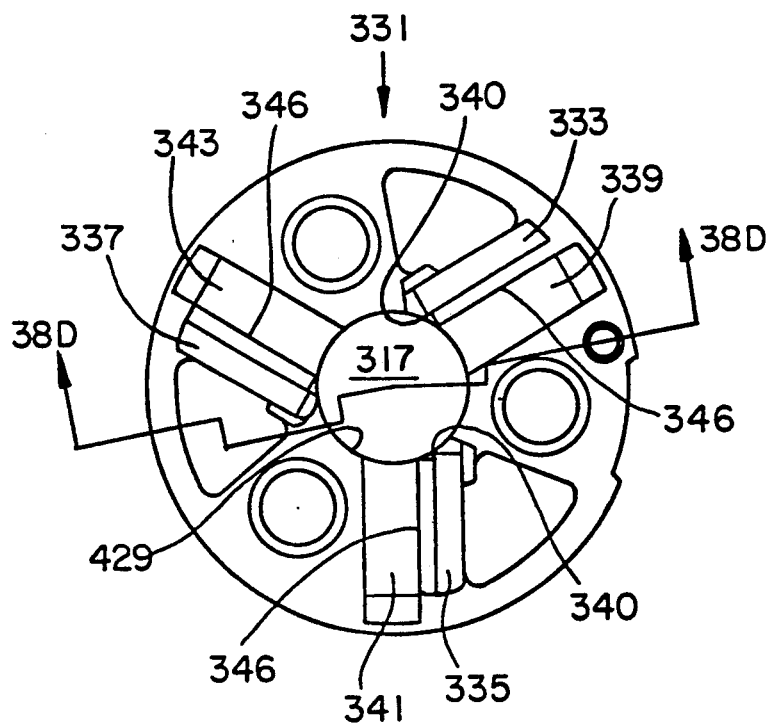
FIG. 38C shows a front elevational view of the divider shown in FIGS. 38A and 38B viewed along line 38C—38C of FIG. 38B.
Figure 38D:
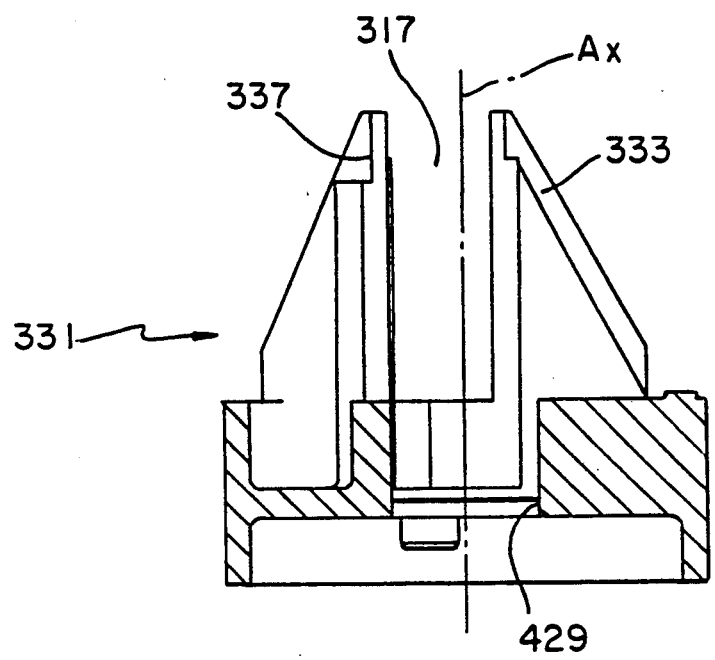
FIG. 38D is a longitudinal cross-sectional view of the divider shown in FIG. 38C taken along line 38D—38D.
Figure 39A:
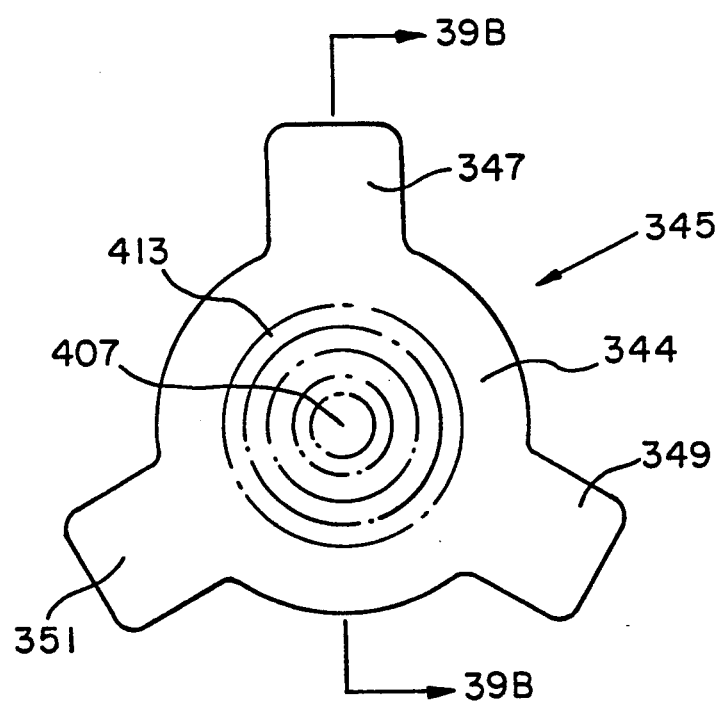
FIG. 39A is a rear elevational view of a carrier for the chuck shown in FIG. 34.
Figure 39B:
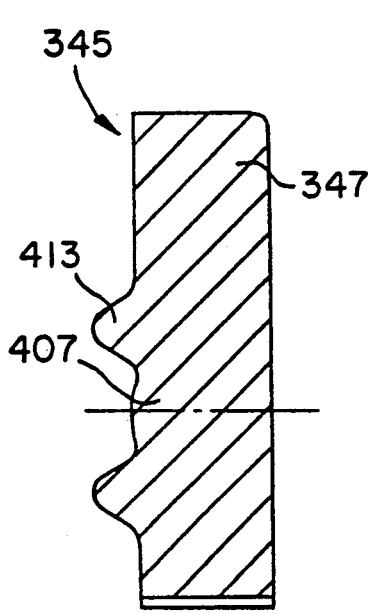
FIG. 39B is a longitudinal cross-sectional view of the carrier shown in FIG. 39A taken along line 39B—39B.
Figure 40A:
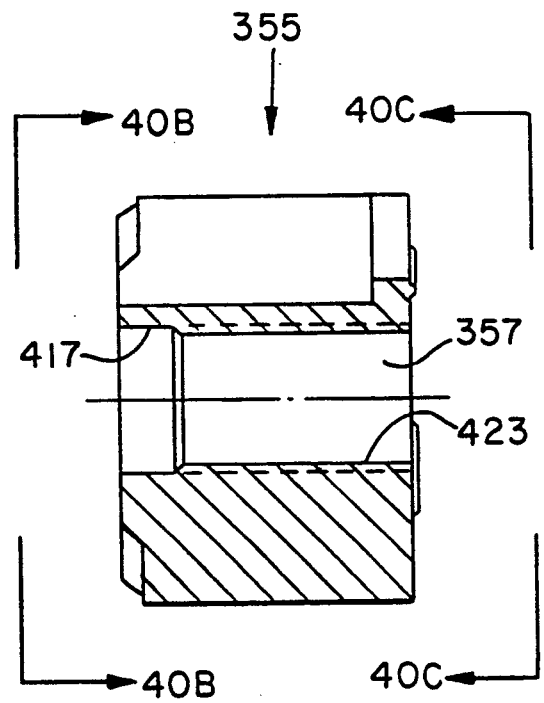
FIG. 40A is a longitudinal cross-sectional view of a nut for the chuck shown in FIG. 34.

A nut 355 (FIGS. 34, 35, 40) is fixed to housing 311 and has a threaded opening 357 coaxial of the longitudinal axis $A_x$. Nut 355 is preferably fixed to housing 311 by plurality of bolts 359 (only one shown) captured in openings 360, 361, 362. Alternatively, nut 355 may be fixed to housing 311 by being formed integrally therewith. As shown in FIGS. 38A, 40C opening 361 has a flaired shape to uniquely mate with a projection 364 on divider 331. On the forward nut face (FIG. 40) each opening 360, 361, 362 is surrounded by an annular rim 368 (corresponding to rim 106B (FIG. 17B) of the first embodiment) which, upon assembly, penetrates into rear surface 366 of divider 331. As a result, nut 355 and divider 331 can be assembled and reassembled in only one relative angular relationship for the same purpose as described in connection with the first embodiment (FIGS. 1-33). To provide a deformable interface with nut 355, the rear surface 366 of divider 331 has numerous pyramidal structures (not shown) identical to pyramidal structures 208 shown and described in connection with FIGS. 31, 32.

Spindle 305 is threadably engaged in nut opening 357; is movable forwardly toward stop 345 to engage and fix carrier 345 and jaws 323, 325, 327 in an axial location and to apply clamping force to the jaws; and is movable rearwardly away from carrier 345 to remove the clamping force. Forward and rearward movement of spindle 305 is controlled by relative rotation of jaw assembly 303 (jaw housing 311, divider 331 and nut 355) relative to spindle 305 which is fixed to and rotatable with rear sleeve 307 and lock assembly 309. In the preferred embodiment depicted, spindle 305 also forms the output shaft of the power tool. Spindle 305 is supported in the power tool by a bearing 356 and is driven through a gear (not shown) press fitted on the section 358 of spindle 305. Alternatively, spindle 305 may have a threaded open end for retrofitting onto a tool spindle similar to spindle 24 of the first embodiment.

In operation, bit 315 is inserted into chuck 301 by inserting the base of the bit axially through opening 313 into central guideway 317. The base of bit 315 pushes the jaws 325, 327, 329 rearwardly against the bias of spring 353 thereby separating the jaws to a diameter sufficient to receive the diameter of bit 315. Bit 315 is preferably inserted into guideway 317 until bit 315 engages the forward face of carrier 345. Spring 353 forwardly biases the jaws into engagement with the bit to hold the bit coaxially in guideway 317 for clamping. Bit 315 may then be clamped in guideway 317 by disengaging lock assembly 309 and rotating jaw assembly 303 (jaw housing 311, divider 331 and nut 355) relative to spindle 305, sleeve 307 and lock assembly 309 which are fixed together. Preferably one hand is used to grip and disengage lock assembly 309 and the other hand is used to grip and rotate jaw housing 311 relative to lock assembly 309. Because bit 315 is held in a coaxially centered position, there is no need to grip bit 315 as the clamping force is being applied. In this manner, spindle 305 is advanced into central guideway 317 until the tip of spindle 305 is firmly engaged with the rear face of carrier 345 to apply a clamping force to the carrier 345 and in turn to jaws 325, 327, 329. When the jaws have been manually tightened on bit 315 in this manner, jaw assembly 303 and spindle 305 are rotatable together.

As will be appreciated, the use of spring bias jaws simplifies the mounting of a bit 315 in chuck 301 because there is no need to grip bit 315 following insertion into opening 313. The self holding feature of spring biased jaws is also advantageous if an operator wishes to tighten chuck 301 by rotation of spindle 305 under power. In this instance one hand is used to actuate the drill trigger and the other hand is used to grip lock assembly 309 and jaw housing 311 together.

Lock Assembly

In accordance with another feature of the invention and as shown in FIGS. 34, 35, 37, 40, 42; lock assembly 309 is movable between a locked position to limit rotation of the spindle 305 relative to the nut 355 and an unlocked position to permit rotation of spindle 305 relative to nut 355. Lock assembly 309 comprises an outer sleeve 363 and an inner sleeve 365 which coaxially surround spindle 305 and nut 355 and are longitudinally slidably between a forwardly biased locked position and a rearward unlocked position. Sleeves 363, 365 are fixed together and are forwardly biased by a coil spring 367 extending coaxially of spindle 305 between an end wall 369 of rear sleeve 307 and an end wall 371 of sleeve 365.

Figure 37A:
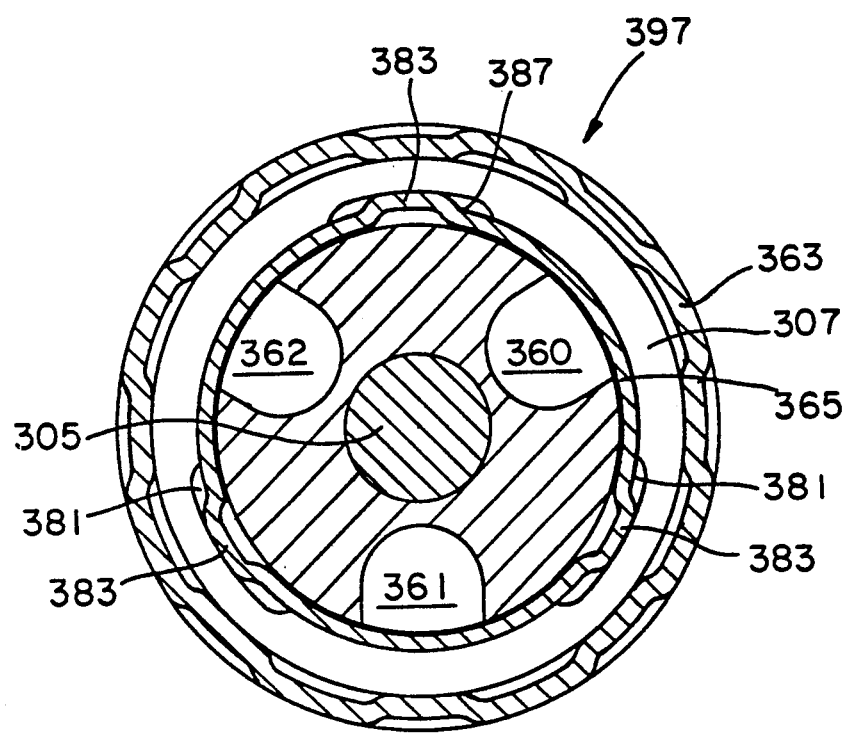
FIG. 37A is a transverse cross-sectional view of the chuck shown in FIG. 34 taken along line 37A—37A.

Rear sleeve 307 is fixed to spindle 305 with an interference fit on a splined segment 379 (FIGS. 34, 41) of spindle 305 and has a plurality of axially extending guides 381 (FIG. 37A). Inner locking sleeve 365 has a plurality of guides 383 interlocking with adjusting sleeve guides 381 for limiting the relative rotation of locking sleeves 365 relative to rear sleeve 307 and for permitting fore and aft movement of sleeve 365 relative to sleeve 307. As shown in FIG. 37A, guides 383, 381 are preferably constituted by a plurality of tabs projecting from and extending axially in the outer wall of sleeve 365 interlocking respectively with a plurality of slots extending axially along the inner wall of adjusting sleeve 307. Sleeve 365 is telescopically slidable fore and aft within sleeve 307 and is forwardly biased to engage a plurality of forwardly extending teeth 373 on end wall 371 with a complimentary set of rearwardly extending teeth 375 on rear wall 377 of nut 355 in the locked position and is manually retractable against the bias of spring 367 to disengage teeth 373, 375 in the unlocked position.

Figure 40B:
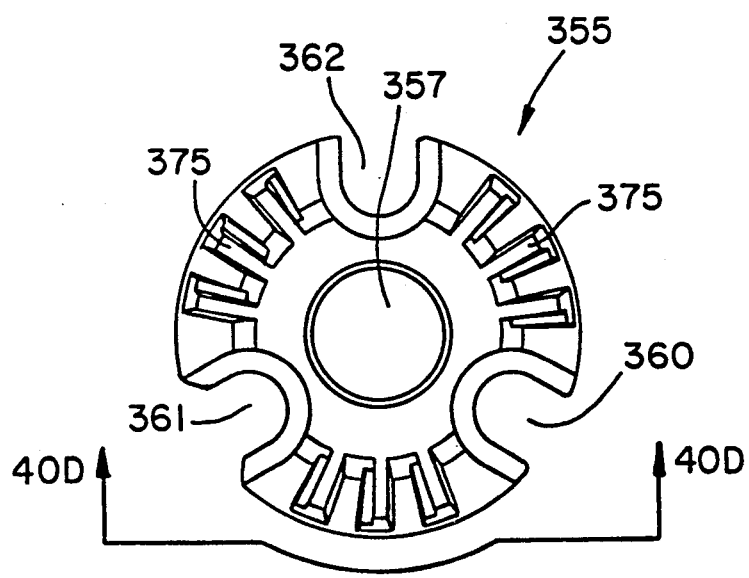
FIG. 40B is a rear elevational view of the nut shown in FIG. 40A taken along line 40B—40B.
Figure 40C:
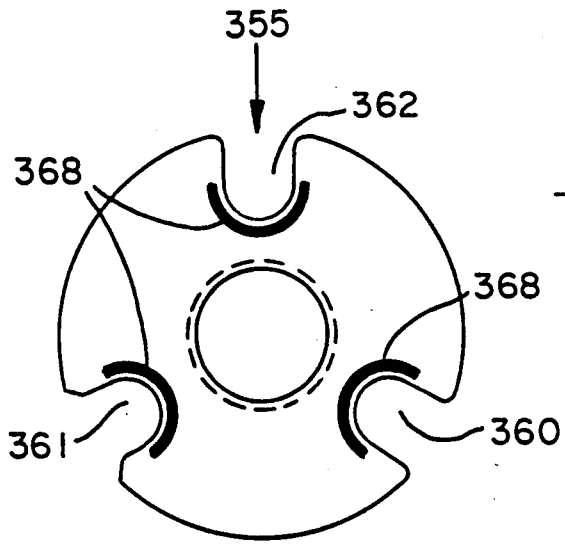
FIG. 40C is a front elevational view of the nut shown in FIG. 40A taken along line 40C—40C.
Figure 40D:
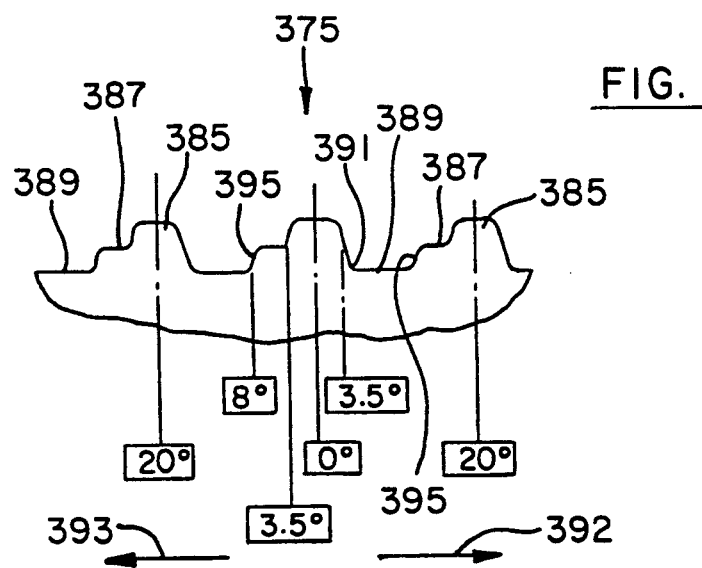
FIG. 40D is a fragmentary side elevational view of the nut shown in FIG. 40B taken along line 40D—40D.
Figure 42A:
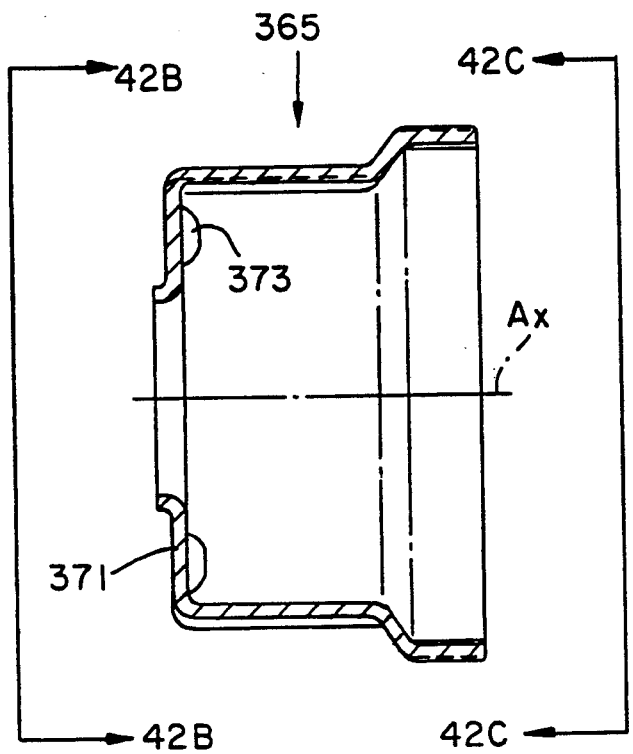
FIG. 42A is a longitudinal cross-sectional view of a locking sleeve for a lock assembly for the chuck shown in FIG. 34.
Figure 42B:
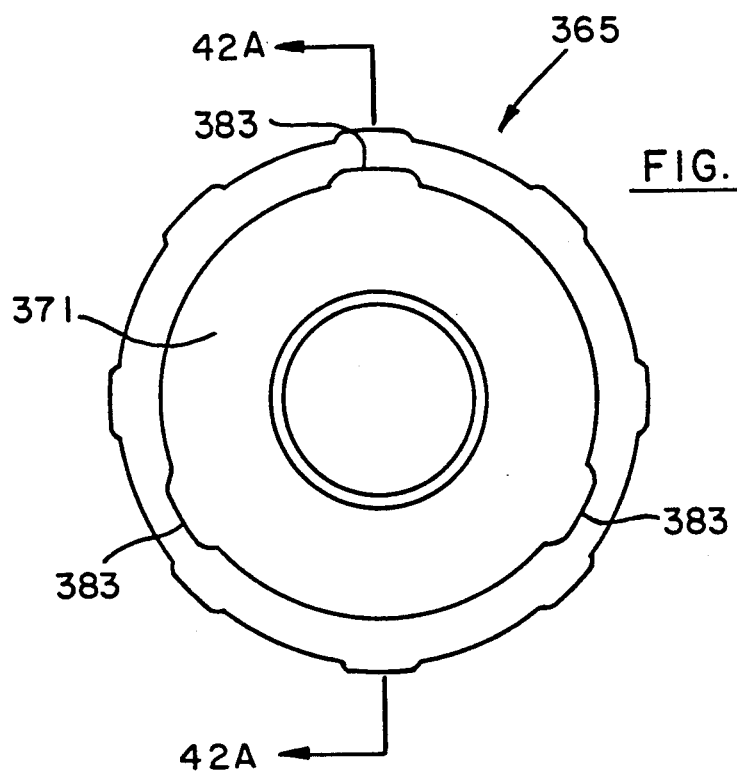
FIG. 42B is a rear elevational view of the locking sleeve shown in FIG. 42A taken along line 42B—42B.
Figure 42C:
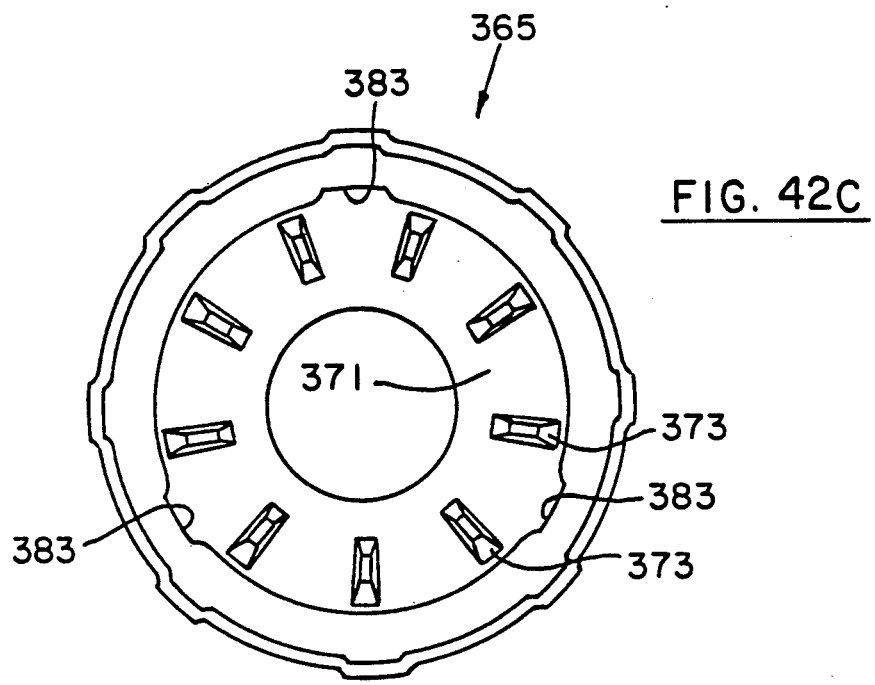
FIG. 42C is a front elevational view of the locking sleeve shown in FIG. 42A taken along line 42C—42C.

As shown in FIGS. 40B, 40D, 42C, teeth sets 373, 375 are sized and spaced to permit a first limited maximum amount of relative rotation between nut 355 and sleeve 365 in a first direction to forwardly advance spindle 305 and a second limited maximum amount of relative rotation between nut 355 and sleeve 365 in a second direction to retract spindle 305. The first amount is larger than the second amount. As shown in FIG. 42C, teeth 373 are preferably spaced and centered at 40° increments. As shown in FIGS. 40B, 40D, teeth 375 are preferably spaced and centered at 20° increments providing incremental self-tightening ranging between 0° and 20° and incremental self loosening between 0° and approximately 12°. Each tooth 375 (FIG. 40D) has a stair stepped profile in the axial direction with a top step 385 and a bottom step 387. A tooth 373 is slidable from the crest of a top step 385 to valley 389 adjacent bottom step 387 and is engagable with the flank 391 of the next adjacent tooth 385 when nut 355 and spindle 305 are relatively rotated to advance spindle 305 and is engagable with the flank 395 of the adjacent bottom step 387 when nut 355 and spindle 305 are relatively rotated to retract spindle 305.

In operation, incremental self-tightening occurs when the bit 315 is forwardly driven and is caused by the torque transmitted through the chuck in response to the application of bit 315 to a workpiece causing nut 355 to rotate to the right in FIG. 40D as indicated by arrow 392. The incremental self-tightening can range between 0° and 20°. A moderate amount of self-tightening is desirable to insure bit 315 is tightly held by the chuck in high torque power tool applications. Following manual tightening by relative rotation of jaw assembly 303 and spindle/sleeve assembly 305, 307, a tooth 373 may initially engage a tooth 375 on any one of the adjacent surfaces 385, 387, 389. When nut 355 is rotated to right as bit 315 is driven in the forward direction, nut 355 may be rotated until a tooth 373 engages a flank 391 of a tooth 375 by sliding tooth 373 across surfaces 385, 387, 389 which are descending in height.

Incremental self loosening occurs when a bit 315 is driven in reverse and is caused by the torque transmitted through the chuck from the workpiece causing nut 355 to move to the left in FIG. 40D as indicated by arrow 393. Loosening of nut 355 is limited by the movement of a tooth 373 between engagement with flank 391 and opposed flank 395. The limitation of self loosening to less than the full 20° between adjacent top steps 385 of teeth 375 is desirable to prevent a bit from becoming too loose within jaws 325, 327 and 329 of the chuck.

Incremental self-tightening is desirable to insure that the bit 315 is adequately tightened for forward drilling. The wide spacing of teeth 375 is desirable to insure that teeth 373 reliably seat and lock within teeth 375 but permits incremental self loosening when driving the bit in reverse direction which is undesirable. The foregoing tooth design limits the amount of loosening to acceptable amounts while permitting a larger level of self-tightening. The preferred amounts of self-tightening and self loosening have been empirically determined. An excessive amount of self-tightening will ultimately prohibit an operator from manually loosening the chuck for bit removable. Incremental self loosening is tolerated to enhance the reliability of the seating and locking of the teeth 373, 375.

Automatic Tightener

Figure 37B:
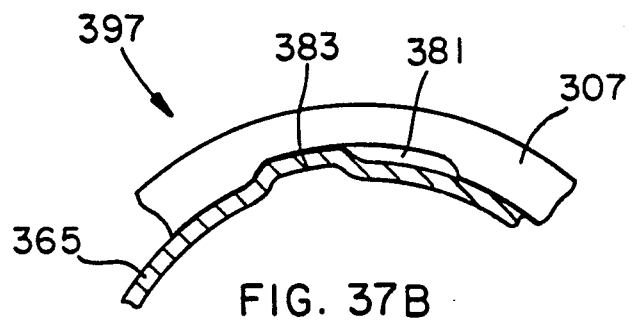
FIGS. 37B and 37C are fragmentary cross-sectional views similar to FIG. 37A and showing two operating positions of automatic tightener for the chuck shown in FIG. 34.

In accordance with another feature of the invention, the chuck comprises an automatic tightener 397 to further increase self-tightening of the jaws 325, 327, 329 on a bit 315 beyond the amount inherent in the design of teeth 373, 375. As shown best in FIGS. 34, 37, tightener 397 is engaged among spindle 305, inner sleeve 365 and nut 355 for tightening jaws 325, 327, 329 on a bit 315 a predetermined amount when (1) spindle 305 is driven, (2) bit 315 is engaged with a workpiece and (3) sleeve 365 is in the locked position. In the preferred embodiment illustrated in FIGS. 37A, 37B, 37C, automatic tightener 397 comprises interlocking slots 381 and tabs 383 which limit the relative rotation of adjusting sleeve 307 and inner sleeve 365. Each slot 383 has an arcuate width extending transverse to the longitudinal axis $A_x$ greater than the arcuate width of tab 383 to permit a predetermined amount of relative rotation between rear sleeve 307 and inner sleeve 365. Sleeve 365 is thus rotatable relative to rear sleeve 307 within the limits of movement permitted by the movement of tabs 383 within slots 381. When a bit 315 is tightened manually, teeth 373, 375 are disengaged and tabs 383 are moved counterclockwise in slots 381 as shown in FIG. 37B. Then when locking assembly 309 is locked and bit 315 is engaged with a workpiece, tabs 383 are then shifted clockwise in slot 381 to incrementally self tighten a predetermined amount. The range of movement of tabs 383 within slots 381 determines the amount of self-tightening provided by the automatic tightener in addition to the 0°–20° self-tightening provided by teeth 373, 375.

Figure 37C:
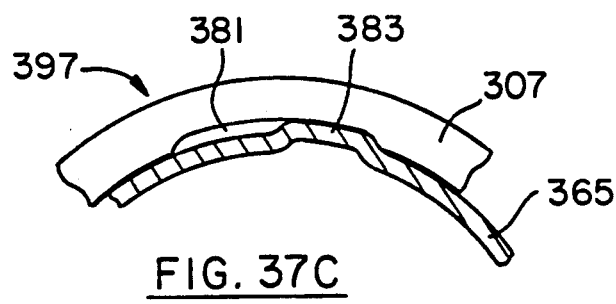

To operate the automatic tightener, lock assembly 309 is disengaged by sliding sleeve 365 rearwardly against the bias of spring 367 to disengage sleeve teeth 373 and nut teeth 375. Then jaw assembly 303 is manually rotated clockwise while rear sleeve 307 is held initially stationary (as viewed by facing the front of the chuck) (FIG. 37A). When jaws 325, 327, 329 are tightened on a bait 315, jaw assembly 303 and the spindle/sleeve assembly 305, 307 are rotated as a unit clockwise (FIG. 37A) while sleeve 365 is held in the retracted position. By holding sleeve 365 in a retracted position, tabs 383 are shifted in slots 381 until the leading edge of slot 381 engages the trailing edge of tab 383 as shown in FIG. 37B. When tightening of the bit is complete, sleeve 365 is released and is spring biased into a locked position with teeth 373, 375 engaged. Upon initial drilling with bit 315 in a workpiece, a counterclockwise torque is applied to jaw assembly 303 through teeth 373, 375 to sleeve 365. As shown in FIG. 37C, sleeve 365 is automatically rotated clockwise relative to spindle 305 and rear sleeve 307 to shift the leading edges of tabs 383 into engagement with the trailing edges of slots 381. This results in the advancement of spindle 305 toward carrier 345 and increased tightening of jaws 325, 327, 329 on a drill bit 315.

Spindle/Stop Deformable Interface

Figure 43:
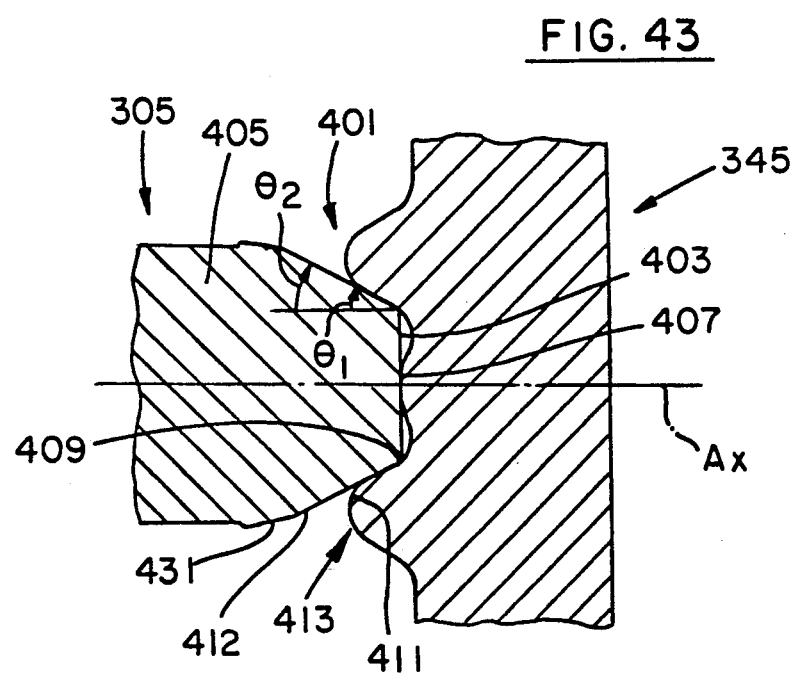
FIG. 43 is a fragmentary longitudinal cross-sectional view of the deformable interface between the spindle and carrier for the chuck shown in FIG. 34.

In accordance with another feature of the invention, the chuck further comprises, as shown in FIG. 43, a deformable interface 401 between carrier 345 and spindle 305 for facilitating the coaxial alignment of spindle 305 and carrier 345. Deformable interface 401 comprises the interface between the front face 403 of spindle tip 405 and a centrally disposed projection 407 on carrier 345 and the interface between an edge 409 on spindle tip 405 and the inner wall 411 of a rim 413 formed on carrier 345 surrounding projection 407. Rim wall 411 and tip side wall 412 are inclined at outwardly divergent angles so that contact between tip 405 and rim 413 is limited to a narrow annular band surrounding edge 409. For example, in the preferred embodiment, the angle $\theta_1$ between wall 411 and the horizontal is 30° and the angle $\theta_2$ between wall 412 and the horizontal is 29°. Alternatively, rim wall 411 and tip side wall 412 may be inclined (from the interface between walls 411, 412) at inwardly divergent angles. Projection 407 is sized to form a small area patch following deformation in accordance with the criteria set forth for patch 72 (FIG. 8) of the first embodiment). In the preferred embodiment, the distal end of tip 405 is frustroconical such that face 403 and surrounding edge 409 are circular and rim 413 formed on carrier 345 is annular. It will be recognized that a wide range of complimentary shapes are suitable consistent with the objectives of limiting the contact area between spindle 305 and carrier 345 and the deformability of the interface 401 when spindle 305 is forced into engagement with carrier 345 upon assembly of the chuck. Spindle 305 is made of steel and carrier 345 is made of precision blanked steel.

When the chuck is first assembled, jaw assembly 303 and nut 355 are held in precise coaxial alignment and the rear assembly of rear sleeve 307 and spindle 305 are held in precise coaxial alignment. Thus as spindle 305 is screwed into engagement with carrier 345, tip 405 and carrier 345 are precisely seated relative to each other consistent with the coaxial alignment of their assemblies. The interface between edge 409 and rim sidewall 411 is deformed by edge 409 cutting into and forming a circular recess in sidewall 411. The interface between projection 407 and spindle tip face 403 is deformed by the formation of a flattened surface on projection 407 which functions as a small area contact patch as in the first embodiment. In subsequent use of chuck 11, carrier 345 retains jaw housing in precise alignment with spindle 305 because of (1) the precision fit of carrier 345 within central guideway 317 and (2) the precision formed interface 401 between spindle 305 and carrier 345.

Spindle/Nut Alignment

Figure 41:
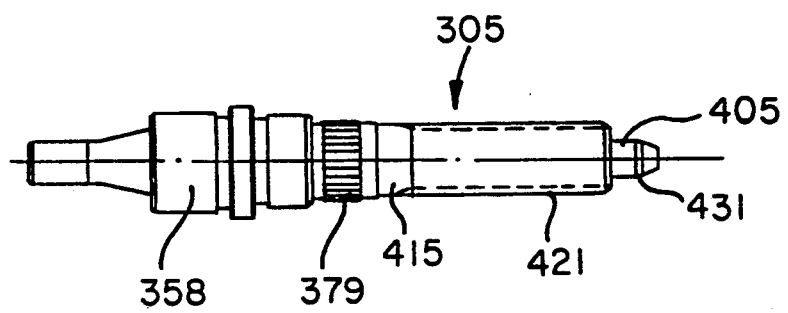
FIG. 41 is a side elevational view of a spindle for the chuck shown in FIG. 34.

In accordance with another feature of the invention and as shown best in FIGS. 34, 40A, 41, spindle 305 has a precision ground cylindrical first section 415 mating with a precision formed smooth walled the first section 417 of nut opening 357 and has a threaded second section 421 mating with a threaded second section 423 of nut opening 357. Spindle threaded section 421 has a flattened outer surface equal in diameter to the spindle smooth section 415. Spindle section 421 is formed by first threading and then grinding to a precise outer diameter which flattens the sharp points of the threads. The interface between spindle smooth section 415 and nut smooth section 417 determines the precise coaxial alignment of nut 355 and spindle 305. The threads of threaded spindle section 421 and threaded nut section 423 are formed to have only a loose meshing engagement to control fore and aft movement of the spindle through the nut without affecting the coaxial alignment. The mating cylindrical interfaces of the nut and spindle enable greater precision in the coaxial alignment compared with a mating interface relying in part on threading accuracy for alignment.

A removable retainer 425 (FIG. 35) is press fitted on spindle tip 405 projecting through the forward end of nut 355 for preventing removal of the spindle 305 from nut 355 in normal operation and for permitting selective removal of spindle 305 from nut 355 for servicing of chuck 301. Spindle tip 405 has a diameter smaller than the diameter of nut opening 357 and has a slightly enlarged rim 431 to form a tight frictional fit with the inner diameter of retainer 425. Retainer 425 is preferably a conical washer having an outer diameter larger than the diameter of nut opening 357 and slightly smaller than the inner diameter of divider opening 429 and having a forwardly facing convex face 427. When spindle 305 is retracted the maximum amount to position washer 425 in divider opening 429 with the rear face of washer 425 in engagement with the forward face of nut 355, divider opening 429 restrains the flattening of washer 425 to prevent removal of spindle 305 from nut 355 in normal operation. For removal, a high torque load is applied manually to chuck 301 for relative rotation of nut 355 and spindle 305 to force the sliding of tip 405 from retainer 425.

Thus it will be appreciated from the above that as a result of the present invention, a highly effective keyless chuck and method of assembly therefor is provided by which the principal objective, among others, is completely fulfilled. It will be equally apparent and is contemplated that modification and/or changes may be made in the illustrated embodiments without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

We claim:

1. A chuck comprising:
   a jaw housing having a forwardly disposed opening to receive a bit, a central guideway, a plurality of jaw guideways and a longitudinal axis;

a plurality of jaws slidably mounted in the respective jaw guideways between a rearward opened and a forward closed position;

a carrier engaged with the jaws and slidably mounted in the central guideway for maintaining each jaw in the same relative axial location;

a nut fixed to said housing and having a threaded opening coaxial of the longitudinal axis;

a threaded spindle (a) engaged in the nut opening, (b) movable forwardly toward the carrier (1) to engage and fix the carrier and jaws in an axial location and (2) to apply clamping force to the jaws and (c) movable rearwardly away from the carrier (1) to disengage the carrier and (2) to remove the clamping force; and biasing means for biasing the jaws and the carrier forwardly to the closed position both when the spindle is engaged with the carrier and when the spindle is disengaged from the carrier.

2. The chuck of claim 1 further comprising a lock assembly movable between a locked position to limit rotation of the spindle relative to the nut and an unlocked position to permit rotation of the spindle relative to the nut.

3. The chuck of claim 2 further comprising a rear sleeve fixed to the spindle, said lock assembly comprising a locking member, said locking member and said nut each having a plurality of teeth, the locking member teeth and the nut teeth engaged when in the locked position and disengaged when in the unlocked position.

4. The chuck of claim 3, wherein the rear sleeve and the locking member include an engaged tab and slot to limit the relative rotation of the rear sleeve and locking member.

5. The chuck of claims 3 or 4 further comprising a lock biasing means for biasing the lock member into the locked position.

6. The chuck of claim 1 further comprising:

a rear sleeve fixed to the spindle and having an axial guide;

a locking sleeve surrounding the spindle and nut, disposed between the rear sleeve and the jaw housing, having teeth and having a guide interlocking with the rear sleeve guide for limiting the relative rotation of the locking sleeve relative to the rear sleeve and for permitting fore and aft movement of the locking sleeve relative to the rear sleeve;

said nut having teeth engagable with the locking sleeve teeth; and a lock biasing means for biasing the locking sleeve to engage the locking sleeve teeth with the nut teeth.

7. The chuck of claim 1 further comprising a removable retainer engaging the spindle for permitting selective removal of the spindle from the nut.

8. The chuck of claim 7, wherein said spindle has a tip projecting through the forward end of the nut opening and the retainer is engaged with the spindle tip.

9. The chuck of claim 8, wherein the spindle tip has a diameter smaller than the diameter of the nut opening and the retainer is a conical washer having an outer diameter larger than the diameter of the nut opening and a convex face facing forwardly.

10. The chuck of claim 1, wherein the spindle has a remote end defining with the carrier a small contact patch therebetween and the area of said contact patch is less than the cross-sectional area of said threaded spindle in a plane transverse to the principle axis of the spindle.

11. A chuck comprising:

a jaw housing having a forwardly disposed opening to receive a bit, a central guideway, a plurality of jaw guideways and a longitudinal axis;

a plurality of jaws slidably mounted in the jaw guideways between a rearward opened and a forward closed position;

a carrier engaged with the jaws and slidably mounted in the central guideway for maintaining each jaw in the same relative axial location;

a nut fixed to the jaw housing and having a threaded opening coaxial of the longitudinal axis;

a threaded spindle engaged in the nut opening and movable forwardly to apply clamping force to the jaws and rearwardly to remove clamping force;

a manually actuated locking member movable between a locked position engaging the nut to limit the relative rotation of the spindle and nut and an unlocked position disengaging the nut permitting relative rotation of the spindle and nut; and an automatic tightener engaged among the spindle, locking member and nut for tightening the jaws on a bit a predetermined amount when the spindle is driven, the bit is engaged with a workpiece and the locking member in the locked position.

12. The chuck of claim 11 further comprising:

a rear sleeve fixed to the spindle;

said nut and locking member having teeth engaged in the locked position and disengaged in the unlocked position; and the rear sleeve and locking member having an engaged tab and slot to limit the relative rotation of the rear sleeve and locking member, said slot having a width extending transverse to the longitudinal axis greater than the transverse width of the tab to permit a predetermined amount of relative rotation between the rear sleeve and locking member, said automatic tightener comprising said tab and slot.

13. The chuck of claim 12, wherein said slot extends axially along the inner wall of the rear sleeve, said locking member includes a sleeve and is telescopically adjustable relative to the rear sleeve, and said tab projects from an outer wall of the locking member.

14. The chuck of claim 11, wherein said nut has a first set of spaced teeth, said locking member has a second set of spaced teeth and the size and spacing of the two sets of teeth permitting a first limited maximum amount of relative rotation between the nut and locking member in a direction to advance the spindle.

15. The chuck of claim 14, wherein the size and spacing of the two sets of teeth permits a second limited maximum amount of relative rotation between the nut and locking member in a second direction to retract the spindle and the first amount being larger than the second amount.

16. The chuck of claim 15, wherein each tooth of one set of teeth has a stair stepped profile in the axial direction and with top and bottom steps, the teeth of the second set slidable from the crest of the top step to a valley adjacent the bottom step and engagable with the flank of the next adjacent tooth of the first set of teeth when the nut and spindle are relatively rotated to advance the spindle and engagable with the flank of the bottom step when the nut and spindle are relatively rotated to retract said spindle.

17. A chuck comprising:

a jaw housing having a forwardly disposed opening to receive a bit, a central guideway, a plurality of jaw guideways and a longitudinal axis;

a plurality of jaws slidably mounted in the jaw guideways between a rearward opened and a forward closed positions.

a carrier engaged with the jaws and slidably mounted in the central guideway for maintaining each jaw in the same relative axial location;

a nut fixed to the jaw housing and having a threaded opening coaxially with the longitudinal axis;

a threaded spindle engaged in the nut opening and movable forwardly to apply clamping force to the jaws and rearwardly to remove the clamping force;

a locking member having a set of spaced locking teeth;

said nut having a set of spaced nut teeth;

said locking member movable between a locked position with the locking teeth in engagement with the nut teeth and an unlocked position with the nut teeth and locking teeth disengaged.

the size and spacing of the two sets of teeth permitting a first limited maximum amount of relative rotation between the nut and locking member in a first direction to advance the spindle and second limited maximum amount of relative rotation between the nut and locking member in a second direction to retract the spindle, the first amount being larger than the second amount.

18. The chuck of claim 17 further comprising an automatic tightener engaged among the spindle, locking member and nut for tightening the jaws on a bit, a predetermined amount when the spindle is driven, the bit is engaged with a workpiece and the locking member is in the locked position.

19. The chuck of claim 18 further comprising:

a rear sleeve fixed to the spindle; and the rear sleeve and locking member having an engaged tab and slot to limit the relative rotation of the rear sleeve and locking member, said slot having a width extending transverse to the longitudinal axis greater than the transverse width of the tab to permit a predetermined amount of relative rotation between the rear sleeve and locking member, said automatic tightener comprising said tab and slot.

20. A chuck comprising:

a jaw housing having a forwardly disposed opening to receive a bit, a central guideway, a plurality of jaw guideways and a longitudinal axis;

a plurality of jaws slidably mounted in the jaw guideways between a rearward opened and a forward closed position;

a carrier engaged with the jaws and slidably mounted in the central guideway for maintaining each jaw in the same relative axial location;

a nut fixed to the jaw housing and having a threaded opening coaxial of the longitudinal axis;

a threaded spindle engaged in the nut opening and movable forwardly to apply clamping force to the jaws and rearwardly to remove the clamping force; and an inelastically deformed interface between the carrier and the spindle for facilitating the coaxial alignment of the spindle and carrier.

21. The chuck of claim 20, wherein the deformed interface comprises the interface between a tip face of the spindle and a centrally disposed projection on the carrier and the interface between an edge on the spindle tip and the inner wall of a rim formed on the carrier surrounding of the projection.

22. A chuck comprising:

a jaw housing having a forwardly disposed opening to receive a bit, a central guideway, a plurality of jaw guideways and a longitudinal axis;

a plurality of jaws slidably mounted in respective the jaw guideways between a rearward opened and a forward closed position;

a carrier engaged with the jaws and slidably mounted in the central guideway for maintaining each jaw in the same relative axial location;

a nut fixed to the jaw housing and having an opening extending coaxially of the longitudinal axis, the opening having a precision smooth walled first section and a threaded second section; and a one piece power tool output spindle engaged in the nut opening and movable forwardly to apply clamping force to the jaws and rearwardly to remove the clamping force, said spindle having a precision smooth walled cylindrical first section mating with the first section of the nut opening and a threaded second section mating with the threaded second section of the nut.

23. The chuck of claim 22, wherein the threaded section of the spindle has a flattened outer surface equal in diameter to the first unthreaded section of the spindle.

24. The chuck of claim 22, wherein (1) the coaxial alignment of the spindle and the nut is determined by the mating interface of the first unthreaded spindle section and the first unthreaded nut section and (2) the threads of the second spindle section are loosely meshed with the threads of the second nut section to control fore and aft movement of the spindle through the nut without affecting the coaxial alignment.

25. The chuck of claims 11, 17, 20, or 22 further comprising biasing means for resiliently biasing the jaws to a closed position.

26. The chuck of claims 11, 17, 20, or 22, wherein relative rotation of the jaw housing and the spindle in a first direction applying a force to forwardly advance the jaws and relative rotation in the opposite direction applying a force to rearwardly retract the jaws.

27. The chuck of claims 11, 17, 20, or 22 further comprising:

a divider in the jaw housing for spacing and guiding movement of the jaws, said divider having a plurality of axially extending walls, each wall having a guide surface;

said jaw housing having a plurality of axially extending guide surfaces adjacent, respectively, one of the divider guide surfaces;

the central guideway defined by the divider guide surfaces and the jaw housing guide surfaces; and said carrier having a hub engaging and guided by the central guideway and a plurality of spokes extending transversely from the hub engaging respective ones of the jaws.

28. A keyless chuck comprising:

a jaw housing containing a plurality of jaws slidably mounted in respective guideways between a retracted position and an advanced position for gripping a tool bit therebetween said jaw housing having a threaded bore therein;

a jaw thrust member engaging said jaws to apply a thrust force thereto; and a threaded spindle in threaded engagement in the bore of the jaw housing and movable forwardly to apply a gripping force to the jaw thrust member and rearwardly to remove the gripping force;

the threaded spindle having a remote end engagable with and defining with said jaw thrust member a small contact patch therebetween, the area of said contact patch less than the cross-sectional area of said threaded spindle in a plane transverse to the principal axis of the threaded spindle.

29. The keyless chuck of claim 28, wherein:

said threaded spindle has a projection at the remote end thereof, the projection having a cross-sectional area less than the cross-sectional area of the threaded member;

said jaw thrust member has a thrust body portion with a plurality of outwardly extending arms for engaging respective jaws in said jaw housing and at least two extension members aligned in the direction of said projection along a principal axis and spaced apart from one another to define a projection receiving gap therebetween; and means for releasably retaining said projection within its projection receiving gap.

30. The keyless chuck of claim 29, wherein said releasable retaining means comprising:

a first diameter surface portion of said projection displaced from the remote end of said projection and a second diameter surface between the remote end of said projection and said first diameter surface, the second diameter surface larger than the first diameter surface, and a first and a second diameter surface defined between said spaced apart extension members, the first diameter surface smaller than the second diameter surface thereof and confronting said first diameter surface portion of said projection when said projection is received within the projection receiving gap.

31. The keyless chuck of claim 30, wherein said spaced part extension members are dimensioned to yield when the second diameter surface of said projection is passed between the first diameter surfaces defined between said space apart extension members.

32. The keyless chuck of claim 31, wherein said jaw thrust member is fabricated from precision blanked steel.

33. A keyless chuck comprising:

a jaw housing having a forwardly disposed opening to receive a bit, a central guideway, a plurality of jaw guideways and a longitudinal axis;

a plurality of jaws slidably mounted in the respective jaw guideway between a rearward opened position and a forward closed position;

a carrier engaged with the jaws and slidably mounted in the central guideway for maintaining each jaw in the same relative axial location;

a nut fixed to said housing and having a threaded opening coaxial of the longitudinal axis;

a threaded spindle engaged in the nut opening and movable forwardly to apply clamping force to the jaws and rearwardly to remove clamping force;

lock means for selectively locking the jaw housing from rotation relative to the spindle, said lock means including a plurality of first teeth associated with the jaw housing and a lock plate connected to the spindle and having a plurality of second teeth selectively engagable with said first teeth to lock the spindle and jaw housing from relative rotation in at least in one direction;

means for resiliently biasing the lock plate and the jaw housing toward one another to engage the first teeth and the second teeth; and a user-operable control sleeve selectively operable to displace the lock plate from the jaw housing and disengage the first teeth from said second teeth.

34. The chuck of claims 30 or 33, further comprising biasing means for resiliently biasing the jaws to an advanced position.

35. The chuck of claims 30 or 33 wherein the relative rotation of the jaw housing and the threaded spindle in a first direction applies a force to advance the jaws and relative rotation in the opposite direction applies a force to retract the jaws.

36. The keyless chuck of claim 33 further comprising:

a hollow chuck adjusting sleeve secured to said threaded spindle for rotation therewith and containing said lock plate for rotation therewith and for relative sliding motion therebetween.

37. The keyless chuck of claim 36, wherein said means for resiliently biasing includes spring means contained within said chuck adjusting sleeve for resiliently biasing said lock plate in the direction of said jaw housing.

38. The keyless chuck of claim 37, wherein:

said lock plate is formed as an annular ring having said second teeth on one side thereof, said annular ring having a plurality of radially extending tabs; and said chuck adjusting sleeve having a plurality of internal slots equal in number to said tabs for receiving said tabs to constrain said annular ring for rotation with said chuck adjusting sleeve.

39. The keyless chuck of claim 38, wherein said control sleeve comprises a tubular portion slidably mounted on said jaw housing and having an end thereof engagable with said annular ring to displace said annular ring in response to a sliding movement of said control sleeve.

40. The keyless chuck of claim 39, further comprising:

cam means between said control sleeve and said lock plate and operable in response to rotation of said control sleeve in a first direction to displace said lock plate from said jaw housing to disengage said first teeth and second teeth.

41. The keyless chuck of claim 40, wherein said cam means is operable in response to rotation of said control sleeve in a second direction to effect engagement of said first teeth and said second teeth.

42. The keyless chuck of claim 41, wherein said cam means further comprises means to constrain said control sleeve for rotation between first and second positions.

43. The chuck of claim 33, wherein the first and second teeth cooperate to lock the jaw housing and threaded spindle from relative rotation to permit retraction of the threaded member and cooperate to effect relative rotation therebetween in response to a torque applied through the chuck to advance the threaded spindle.

44. The keyless chuck of claim 43, wherein said first teeth and second teeth each have a tooth profile including first and second flanks, one more steeply pitched that the other.

45. The chuck of claim 33, wherein the first teeth and second teeth cooperate to lock the jaw housing and threaded spindle from relative rotation to effect retraction of the threaded spindle or relative rotation to advance the threaded spindle.

46. The keyless chuck of claim 45, wherein said first teeth and second teeth each have a tooth profile including first and second flanks, both flanks equally pitched.

47. The chuck of claim 33, wherein the first and second teeth cooperate to lock the jaw housing and threaded spindle from relative rotation to effect retraction of the threaded spindle and cooperate to permit a predetermined, limited increment of relative rotation therebetween in response to a torque applied through the chuck to advance the threaded spindle.

48. The keyless chuck of claim 47, wherein at least one of said first teeth and second teeth have recurring indentations of a first depth and a second depth, a tooth engaging a first indentation movable relative thereto in response to a torque applied through said chuck to a next second indentation, a tooth engaging a second indentation locked therein from movement.

49. A chuck for selectively gripping an element, which comprises:
a jaw assembly including a jaw support member and an adjusting member;
a plurality of jaws contained within the jaw support member of the jaw assembly and movable to an element gripping position;
the jaw support member having a first central axis and a major surface intersecting the first central axis;
the adjusting member having a second central axis and a major surface intersecting the second central axis;
retaining means for retaining together the jaw support and adjusting members with the jaw support member major surface in a mutually opposed relationship with the adjusting member major surface;
inelastically deformed means interposed between the major surfaces of the jaw support and adjusting members and formed integrally with at least a portion of the major surface of either the jaw support member or the adjusting member for facilitating the axial alignment of the first and second central axes of the jaw support and adjusting members, respectively;
a jaw thrust member contained within the jaw support member for applying a thrust force to the plurality of jaws;
a threaded member in threaded engagement with the adjusting member, and
means for relatively rotating the adjusting member on the threaded member to advance the threaded member.

50. A chuck, which comprises:
a spindle;
a support member;
a plurality of jaws movably contained within the support member;
the support member mounted for rotation relative to the spindle to advance and retract the spindle within the support member;
a lock plate having a plurality of teeth formed in one face thereof;
means for mounting the lock plate to limit rotational movement of the lock plate independently of the spindle;
means coupled to the plurality of jaws and having teeth formed in one face thereof for engaging the teeth of the lock plate to limit relative rotational movement between the lock plate and the plurality of jaws and;
means for selectively retaining the lock plate in a position whereby the teeth of the lock plate are disengaged from the teeth of the engaging means to permit relative rotation between the spindle and the support member and thereby permit advancement and retraction of the spindle within the support member.

51. The chuck as set forth in claim 50, wherein the retaining means includes:
the lock plate being formed with a cam-engaging surface, and
means formed with a cam which is engagable with the cam-engaging surface of the lock plate for moving apart the lock plate and the engaging means to separate the teeth thereof and thereby permit movement of the plurality of teeth relative to the support member.

52. A chuck, which comprises:
a jaw support member having a first central axis and a major surface intersecting the first central axis;
a plurality of jaws movably contained within the jaw support member and positionable within the support member for movement toward and into an element gripping position;
an adjusting member having a second central axis and a major surface intersecting the second central axis;
means for retaining together the jaw support member and the adjusting member with the jaw support member major surface in a mutually opposed relationship with the adjusting member major surface;
inelastically deformed means interposed between the major surfaces of the jaw support member and the adjusting member for facilitating the axial alignment of the first and second central axis of the jaw support member into the gripping position;
moving means formed with a bearing surface for moving the plurality of jaws within the support member into the gripping position;
a threaded spindle having a prescribed cross-sectional area and a tip formed with a bearing surface engagable with the bearing surface of the moving means, for applying a force to the moving means; and
the bearing surfaces of the moving means and the spindle tip, respectively formed to engage in a small contact area which is less that the prescribed cross-sectional area of the spindle to limit the internal friction of the chuck to a relatively low level when force is being applied to the moving means.

53. A chuck, which comprises:
a jaw support member having a first central axis and a major surface intersecting the first central axis;
a plurality of jaws movably contained with the jaw support member and positionable within the support member for movement toward and into an element gripping position;
an adjusting member having a second central axis and a major surface intersecting the second central axis;
means for retaining together the jaw support member and the adjusting member with the jaw support member major surface in a mutually opposed relationship with the adjusting member major surface;
inelastically deformed means interposed between the major surfaces of the jaw support member and the adjusting member for facilitating the axial alignment of the central axis of the jaw support member and the adjusting member;

means for preventing movement of the plurality of jaws relative to the jaw support member, means for selectively retaining the preventing means in a disabled position to permit movement of the plurality of jaws relative to the jaw support member;

a threaded spindle formed with a prescribed cross-sectional area and tip formed with a bearing surface engagable with the bearing surface of the moving means, for applying a force to the moving means; and the bearing surfaces of the moving means and the spindle formed to engage in a small contact area which is less than the prescribed cross-sectional area of the spindle to limit the internal friction of the chuck to a relatively low level when force is being applied to the moving means.

* * * * *